(12) United States Patent
Johnson

(10) Patent No.: US 8,801,327 B2
(45) Date of Patent: Aug. 12, 2014

(54) MARINE ROPEWAY

(75) Inventor: Eric G. Johnson, Danvers, MA (US)

(73) Assignee: Halo Maritime Defense Systems, Inc., Andover, MA (US)

( * ) Notice: Subject to any disclaimer, the term of this patent is extended or adjusted under 35 U.S.C. 154(b) by 1 day.

(21) Appl. No.: 13/566,614

(22) Filed: Aug. 3, 2012

(65) Prior Publication Data

US 2013/0064605 A1    Mar. 14, 2013

Related U.S. Application Data

(60) Provisional application No. 61/515,115, filed on Aug. 4, 2011.

(51) Int. Cl.
*E02B 15/06* (2006.01)

(52) U.S. Cl.
USPC .............................................. 405/63; 440/35

(58) Field of Classification Search
USPC .................... 405/63, 64, 66, 195.1, 203, 209; 440/34, 35
See application file for complete search history.

(56) References Cited

U.S. PATENT DOCUMENTS

| | | | |
|---|---|---|---|
| 949,961 A | 2/1910 | Morris | |
| 1,546,031 A * | 7/1925 | Schofield | 472/13 |
| 2,693,161 A | 11/1954 | Stubbs | |
| 3,185,474 A * | 5/1965 | Saiko | 472/13 |
| 3,604,389 A * | 9/1971 | Roberts et al. | 440/34 |
| 3,785,326 A * | 1/1974 | Mullerheim | 440/34 |
| 3,796,281 A | 3/1974 | Dowling | |
| 3,823,680 A * | 7/1974 | Straumsnes | 114/73 |
| 3,838,657 A * | 10/1974 | Fleming | 440/34 |
| 3,864,049 A | 2/1975 | Ono | |
| 4,033,137 A | 7/1977 | Geist | |
| 4,133,182 A * | 1/1979 | Chateau | 405/169 |
| 4,174,185 A | 11/1979 | Toki | |
| 4,272,214 A | 6/1981 | Nyfeldt et al. | |

(Continued)

FOREIGN PATENT DOCUMENTS

CN        201033858 Y    3/2008

OTHER PUBLICATIONS

International Search Report and Written Opinion of the International Searching Authority issued in International Patent Application No. PCT/US2012/049580 dated Oct. 26, 2012.

(Continued)

*Primary Examiner* — Frederick L Lagman
(74) *Attorney, Agent, or Firm* — Miles & Stockbridge P.C.; Michael A. Messina

(57) ABSTRACT

An apparatus is provided for moving a floating or submerged marine structure. Embodiments include a track fixedly mounted near or under the waterline surface, extending from a first point to a second point for defining a path of motion of the marine structure. A riser cable has a first end movably attached to the track between the first and second points, and a second end fixedly attached to the marine structure. A trolley is attached to the first end of the riser cable between the first end and the track, and has a roller for engaging the track for distributing environmental forces of the marine structure to the track. A drive unit is attached to the marine structure (or to the trolley) for moving the marine structure (or the trolley) such that the marine structure or one end of the marine structure moves along the path of the track.

34 Claims, 18 Drawing Sheets

(56) References Cited

U.S. PATENT DOCUMENTS

| | | | |
|---|---|---|---|
| 4,422,799 A * | 12/1983 | Green et al. | 405/158 |
| 4,425,053 A | 1/1984 | Muto et al. | |
| 5,245,942 A | 9/1993 | Constantinis et al. | |
| 5,429,452 A | 7/1995 | Frost | |
| 5,651,709 A | 7/1997 | Nandakumar et al. | |
| 5,808,368 A * | 9/1998 | Brown | 290/53 |
| 5,827,011 A | 10/1998 | Kann | |
| 6,058,072 A * | 5/2000 | Abraham | 367/20 |
| 6,066,049 A * | 5/2000 | Milanian | 472/13 |
| 6,102,616 A | 8/2000 | Foote | |
| 6,591,774 B2 | 7/2003 | Metherell et al. | |
| 6,655,641 B2 | 12/2003 | Sherman et al. | |
| 6,843,197 B1 | 1/2005 | Nixon et al. | |
| 6,860,209 B2 | 3/2005 | McKoy | |
| 6,877,456 B2 | 4/2005 | Metherell et al. | |
| 6,886,484 B2 | 5/2005 | Thomas | |
| 6,960,047 B2 | 11/2005 | Knezek et al. | |
| 6,980,483 B2 | 12/2005 | McDonald | |
| 7,140,599 B1 | 11/2006 | Spink | |
| 7,401,565 B2 | 7/2008 | Nixon et al. | |
| 7,451,527 B2 | 11/2008 | Pearce et al. | |
| 7,481,176 B2 | 1/2009 | Pratt et al. | |
| 7,524,139 B2 | 4/2009 | Bishop | |
| 7,524,140 B2 | 4/2009 | Bishop | |
| 7,572,083 B1 | 8/2009 | Bishop et al. | |
| 7,726,910 B2 | 6/2010 | Foo et al. | |
| 7,887,254 B2 | 2/2011 | Bishop | |
| 7,975,639 B2 | 7/2011 | Bishop | |
| 8,007,202 B2 | 8/2011 | Davis et al. | |
| 8,020,836 B2 | 9/2011 | Bishop | |
| 2003/0170076 A1 | 9/2003 | Macrea et al. | |
| 2003/0190191 A1 | 10/2003 | Clark | |
| 2004/0018060 A1 | 1/2004 | Knezek et al. | |
| 2004/0115002 A1 | 6/2004 | Meeks et al. | |
| 2005/0013668 A1 | 1/2005 | Nixon et al. | |
| 2006/0034668 A1 | 2/2006 | Knezek et al. | |
| 2006/0037526 A1 | 2/2006 | Knezek et al. | |
| 2009/0035068 A1 | 2/2009 | Terai et al. | |
| 2009/0090059 A1 | 4/2009 | Bishop | |
| 2010/0059728 A1 | 3/2010 | Bishop | |
| 2012/0132126 A1 * | 5/2012 | Ozkul | 114/312 |

OTHER PUBLICATIONS

Search History: Limited Classification Search & Global Patent Literature Text Search for International Patent Application No. PCT-US2012-49580. Oct. 12, 2012.

International Preliminary Report dated Feb. 4, 2014, in PCT/US2012/049580.

* cited by examiner

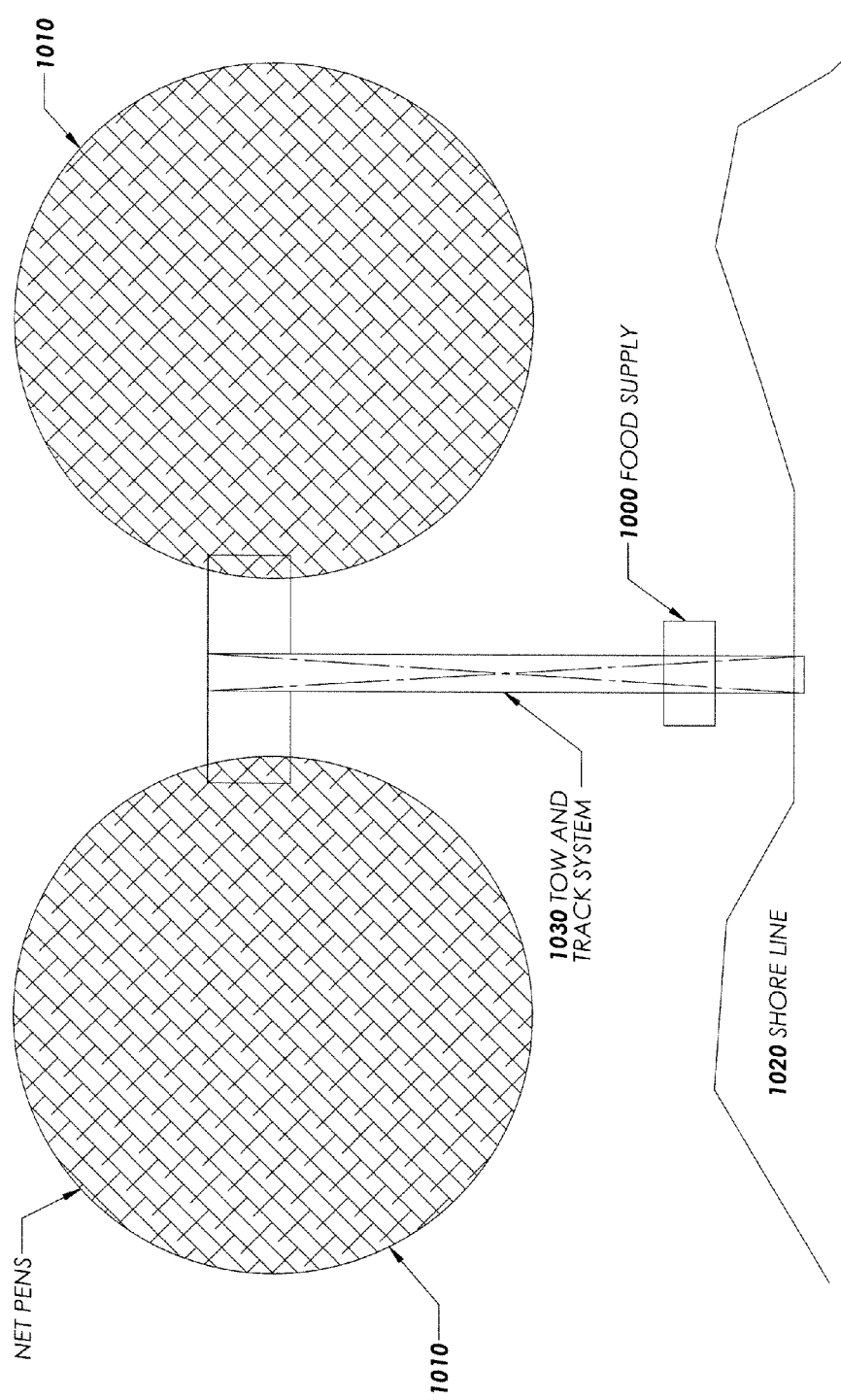

Sliding Barrier Gate 1 in Opened Arrangement

MARINE ROPEWAY

RELATED APPLICATIONS

This application claims the benefit of U.S. Provisional Application No. 61/515,115, filed Aug. 4, 2011, entitled "Moveable Mooring Apparatus," the disclosure of which also is entirely incorporated herein by reference.

TECHNICAL FIELD

The present subject matter relates to floating and submerged marine structures. The disclosed techniques and equipment have particular applicability to floating and submerged structures that need to be repeatedly moved from one position to another, such as barriers, oil booms, nets, etc.

BACKGROUND

Certain marine structures such as oil booms, security barriers, floating and submerged nets, floating breakwaters, marina pontoons, and other floating structures need to be repeatedly moved from one position to another. An example is a gate for a fully enclosed military port or harbor, which must be moved from an open position to a closed position and back again.

Current practice for moving booms, barrier gates, etc. is to make connections at the ends of unit structures, or at the ends of a series of end-to-end linked unit structures. Using these conventional techniques, the structure forms a catenary shape as the forces of wind and current push the floating links into a curved condition, as the ends are the only restraints to these forces. In practice, the connections at these ends carry the forces needed to pull the entire structure taut from end to end, while the forces of current, wind and waves can be broadside to the structure. This can result in a substantial force making closure difficult and requiring latching systems to carry both the forces of loads from wind and waves on the structure, as well as operational forces of fluid drag and moving the mass of the marine structure itself.

Another disadvantage of current techniques for moving marine gates or booms is that they require vessels and personnel to physically do the work of moving the structures, and of latching or connecting the ends of the linked structures to their fixed locations. Those vessels and personnel can mishandle the transit, wandering into navigation channels and sometimes causing marine barriers to flip over. The result is high labor and equipment costs, and the danger of injury to personnel.

Hence a need exists for a safer, less costly, and more reliable way of repeatedly moving floating and submerged marine structures.

SUMMARY

The concepts disclosed herein alleviate the above noted problems with conventional practices. An advantage of the disclosed apparatus for moving a marine structure is that it separates environmental loads of wind, waves, and currents from the operational loads of moving marine structures from point to point, which significantly eases the operational task of pulling lines of buoys, floats, docks, marine gates, and nets to mooring buoys or fixed structures. The disclosed apparatus transfers the environmental forces that act on a marine structure to a separate cable or track system, so the closure and latching forces result primarily from the movement of the marine structure in the water along the cable or track path. Moreover, the disclosed apparatus enables automation and remote operation of the movement of the structure to be safely conducted, as the structure remains tethered to a transport cable or a track system. Thus, the marine structure(s) can be moved by winching, by an attached head vessel with thrusters, or both, potentially saving considerable standby labor costs and injuries from manually making latch connections at sea.

According to the present disclosure, an apparatus for moving a marine structure comprises a transport cable disposed under the surface of a body of water. The transport cable extends from a first point to a second point for defining a path of motion of the marine structure, and is movably mounted such that a riser attachment point on the cable is movable between the first and second points. The apparatus further comprises a riser cable having a first end fixedly attached to the riser attachment point of the transport cable, and a second end fixedly attached to the marine structure; and a drive unit for moving the transport cable such that the riser cable moves between the first and second points and the marine structure moves along the path.

According to a further aspect of the present disclosure, an apparatus for moving a marine structure comprises a track fixedly mounted under the surface of a body of water, extending from a first point to a second point for defining a path of motion of the marine structure. A riser cable has a first end movably attached to the track between the first and second points, and a second end fixedly attached to the marine structure. A trolley is attached to the first end of the riser cable between the first end and the track, and has a roller for engaging the track for distributing environmental forces of the marine structure to the track. A drive unit is attached to the marine structure for moving the marine structure such that the riser cable moves between the first and second points and the marine structure moves along the path.

According to a further aspect of the present invention, the drive unit is attached to the trolley instead of the marine structure, for moving the trolley such that the riser cable moves between the first and second points and the marine structure moves along the path.

According to another aspect of the present invention, an apparatus for moving a marine structure comprises a track fixedly mounted under the surface of a body of water, extending from a first point to a second point for defining a path of motion of the marine structure. A first riser cable has a bottom end movably attached to the track between the first and second points, and a top end fixedly attached to the marine structure. A first trolley is attached to the bottom end of the first riser cable between the bottom end and the track, and has a roller for engaging the track for distributing environmental forces of the marine structure to the track; and a first drive unit is attached to the first trolley for moving the first trolley in a first direction along the track. A second riser cable has a bottom end movably attached to the track between the first and second points, and a top end fixedly attached to the marine structure. A second trolley is attached to the bottom end of the second riser cable between the bottom end and the track, and has a roller for engaging the track for distributing environmental forces of the marine structure to the track; and a second drive unit attached to the second trolley for moving the second trolley in a second direction along the track cable, the second direction being opposite the first direction. A control system is provided for controlling the first and second drive units, responsive to a measured tension in each of the first and second riser cables, such that the riser cables move between the first and second points and the marine structure moves along the path in one of the first direction and the second direction.

According to a further aspect of the present disclosure, an apparatus for moving a buoyant marine structure comprises a track cable extending from a first point to a second point for defining a path of motion of the marine structure at the surface of a body of water, the track cable having first and second opposing ends, the first point and the second point being between the first and second opposing ends. A roller is attached to the marine structure for movably engaging the track cable. A fixed track cable mount is attached to the first end of the track cable, and a track cable drive unit attached to the second end of the track cable for moving the track cable between a first position where the track cable is proximal the surface of the body of water, and a second position where a portion of the track cable is under the surface of the body of water. A marine structure drive unit is attached to the marine structure for moving the marine structure, when the track cable is in the first position, such that the roller moves between the first and second points and the marine structure moves along the path.

According to a further aspect of the present disclosure, an apparatus for moving first and second buoyant marine structures in opposing directions comprises a first tow/track cable drive unit mounted at a first fixed point; and a first tow/track cable having a first end attached to the first tow/track cable drive unit. The first tow/track cable extends along an axis of the first marine structure, is movably attached to the first marine structure, and has a second end fixedly attached to the second marine structure. A second tow/track cable drive unit is mounted at a second fixed point opposite the first fixed point, and a second tow/track cable has a first end attached to the second tow/track cable drive unit. The second tow/track cable extends along an axis of the second marine structure, is movably attached to the second marine structure, and has a second end fixedly attached to the first marine structure. The first tow/track cable drive unit is for moving the first tow/track cable between a first position where the first tow/track cable is proximal the surface of the body of water and a second position where a portion of the first tow/track cable is under the surface of the body of water; and the second tow/track cable drive unit is for moving the second tow/track cable between a first position where the second tow/track cable is proximal the surface of the body of water and a second position where a portion of the second tow/track cable is under the surface of the body of water. The first tow/track cable drive unit is also for moving the first tow/track cable to move the second marine structure towards a central point between the first and second fixed points when the second tow/track cable is in its first position; and the second tow/track cable drive unit is for moving the second tow/track cable to move the first marine structure towards the central point when the first tow/track cable is in its first position.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 10 illustrates an application of the apparatus of the present disclosure to move a feed barge.

DETAILED DESCRIPTION

The disclosed apparatus allows the mooring of a floating or submerged marine structure(s) to be moved along an in-water cable or track system. The apparatus is ideal for repeatedly moving floating structures or net systems into open or closed positions, or load and unload positions. It allows vessels to pass over submerged parts of the system when the floating structures or nets have been moved out of the way using the disclosed apparatus. Generally, the movement of the apparatus is aligned with the longitudinal axis of the floating structures or nets being moved. In other embodiments, one end of a floating line of structures is moved at an angle to the centerline of the apparatus, effectively opening or closing a long catenary of boom or floats, thereby allowing vessels to pass.

An important advantage of the disclosed apparatus is that it enables the separation of environmental loads of wind, waves and currents from operational loads of moving marine structures from point to point, significantly easing the operational task of pulling lines of buoys, floats, docks, marine gates, nets, etc. to mooring buoys or fixed structures.

The disclosed apparatus maintains a continuous connection between the marine structures and the components of the apparatus (e.g., cables or tracks) along which the structures travel. This enables safer, simpler automation and remote control, as the marine structures are never released from the apparatus, and the movement of the marine structures always follows a cable or track, therefore approaching end positions consistently via a controlled path.

Multiples of the disclosed apparatus are used to create arrangements of festooning several marine structures. For example, in one arrangement, pairs of marine structures are connected in the middle to open in opposite directions. A complete arrangement of fixed and moving marine structures can be employed to control waterfront activities, provide environmental or security protection, facilitate crowded waterways, or enable access to floating structures just offshore.

Reference now is made in detail to the examples illustrated in the accompanying drawings and discussed below.

Transport Cable Configuration

Figure 1:
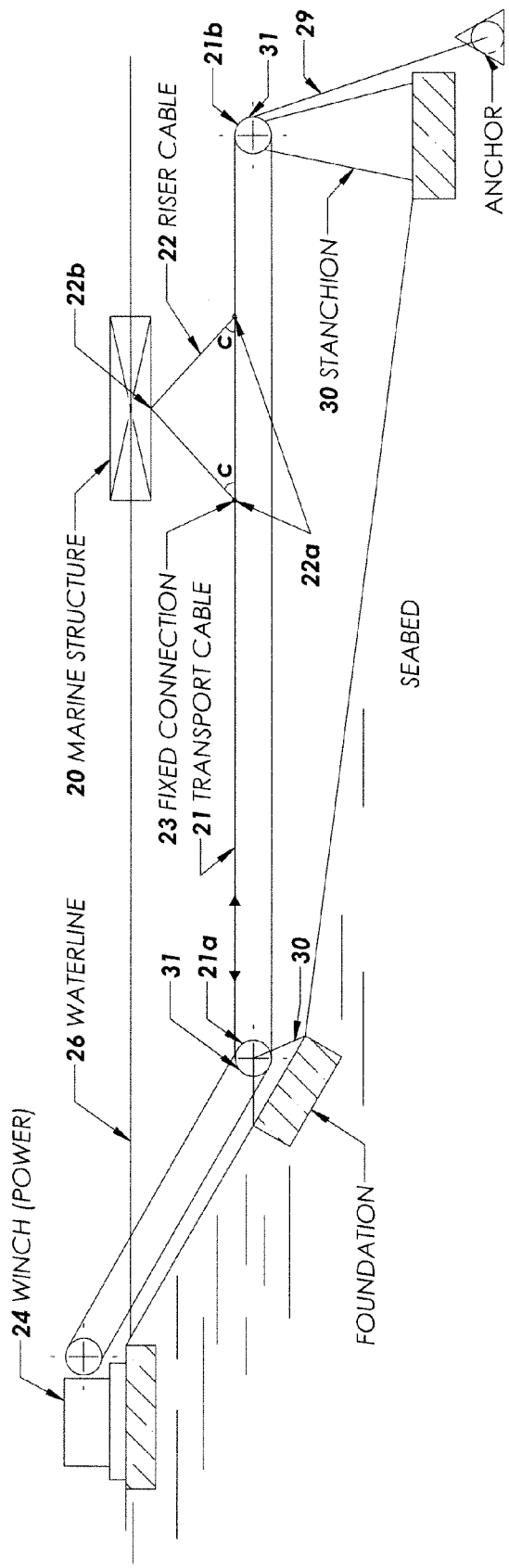
FIG. 1 illustrates an embodiment of the disclosed apparatus that uses an underwater transport cable.

FIG. 1 illustrates an embodiment of the disclosed apparatus that uses an underwater transport cable 21 extending from a first point 21a to a second point 21b for defining a path of motion of a floating or submerged marine structure 20. A riser cable 22 has a first end 22a fixed to a riser attachment point 23 of the transport cable 21, and a second end 22b fixedly attached to marine structure 20, thereby linking marine structure 20 to the transport cable 21, and enabling the marine structure 20 to be moved along a path defined by the transport cable 21. In certain embodiments, marine structure 20 is linked to transport cable 21 by a plurality of riser cables 22.

The transport cable 21 is an endless loop supported by a pair of sheaves 31 rotatably mounted at the first and second points 21a, 21b, on stanchions 30, as shown in FIG. 1. The marine structure 20 is moved by powering the transport cable 21 in either direction between points 21a and 21b via a drive unit. In the embodiment of FIG. 1, the drive unit comprises an onshore or pier mounted conventional winch 24, and a drive cable 25 system under the waterline 26 that drives sheave 31 at point 21a. The system is therefore a fully connected cable system from winch 24 to transport cable 21 to riser system 22 to the marine structure 20 being moved.

In an alternative embodiment, transport cable 21 is a cable connected to a pair of conventional winches 24 (not shown) for winding onto a first one of the winches for moving the riser attachment point 23 from the first point 21a to the second point 21b, and for winding onto a second one of the winches 24 for moving the riser attachment point 23 from the second point 21b to the first point 21a.

The configuration of this embodiment of the disclosed apparatus is simple in design, enabling a temporary or light duty version to be quickly made operational for emergency oil boom use, or to achieve the low cost needed for a simple application, such as moving a line of floats to an open or closed position.

Trolley Guided Configuration

Figure 2:
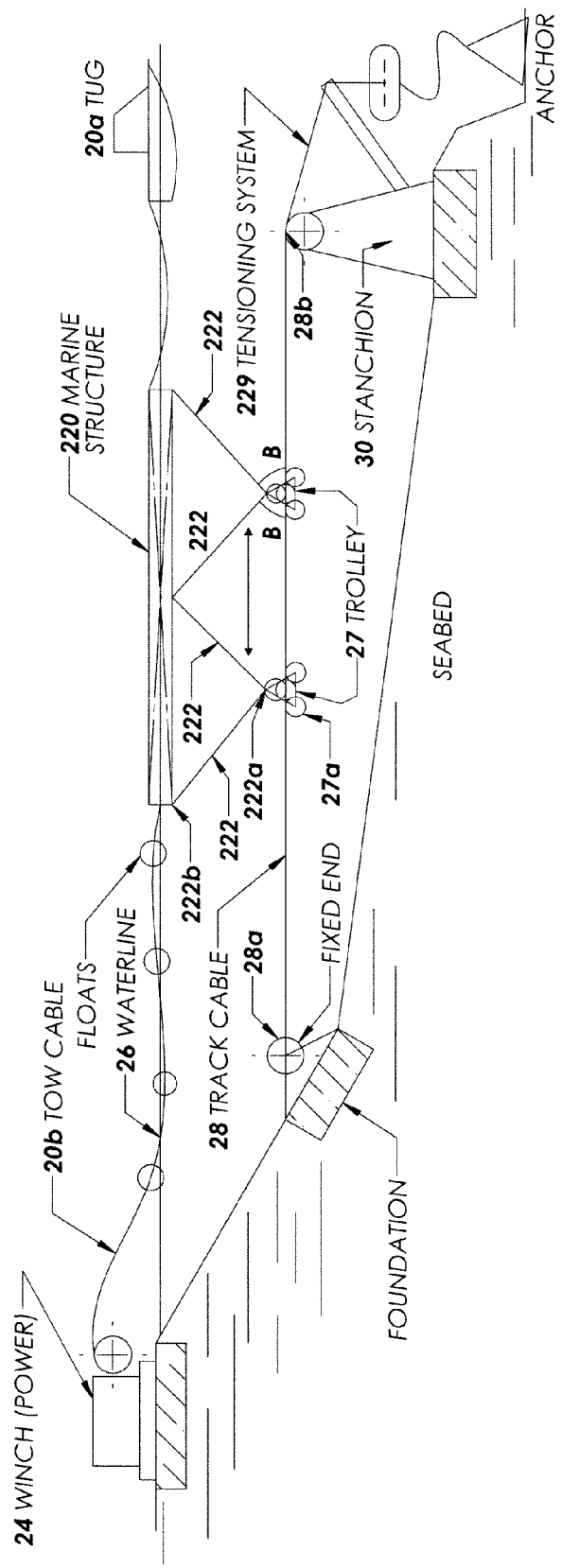
FIG. 2 illustrates an embodiment of the disclosed apparatus that includes a track fixedly mounted under the surface of the water and a tow cable at the waterline.

FIG. 2 illustrates a further embodiment of the present disclosure that includes a track fixedly mounted under the surface of the water. The embodiment of FIG. 2 includes a track, such as a track cable 28, extending underwater from a first point 28a to a second point 28b, for defining a path of motion of a floating or submerged marine structure 220. The track cable 28 is fixed at a depth adequate for vessel passage over it, and tensioned at one end using a tensioning system 229. Stanchions 30 may be used to adapt to various seafloor depths. Riser cables 222 are provided having a first end 222a movably attached to the track cable 28 between the first and second points 28a, 28b, and a second end 222b fixedly attached to the marine structure 222. A trolley 27 is attached to the first end 222a of each of the riser cables 222 between their first end 222a and the track cable 28. Each trolley 27 has at least one roller 27a for engaging track cable 28, and rolls freely along the track cable 28 to distribute environmental forces of the marine structure 220 to the track cable 28.

The apparatus further includes a drive unit attached to the marine structure 220 for moving the marine structure 220 such that the riser cables 222 move between the first and second points 28a, 28b and the marine structure 220 moves along the path defined by the track cable 28. In one embodiment, the drive unit comprises a tow cable 20b with a first end attached to the marine structure 220, and a winch 24 operating at or above the waterline 26 attached to a second end of the tow cable 20b; the tow cable 20b is windable onto the winch 24 for moving the marine structure 220. The drive unit can also include thrusters or tugs 20a.

In this embodiment of the present disclosure, the drive unit is connected directly to the marine structure 220. The underwater track system (including track cable 28) is designed to withstand wind, wave and current loads and be distinctly separate from the surface towing system. It transfers broadside wind, current and wave loads to the track system, reducing the loads managed by the towing equipment. This is a simple configuration of low to moderate cost.

Tow Cable Configuration

Figure 3:
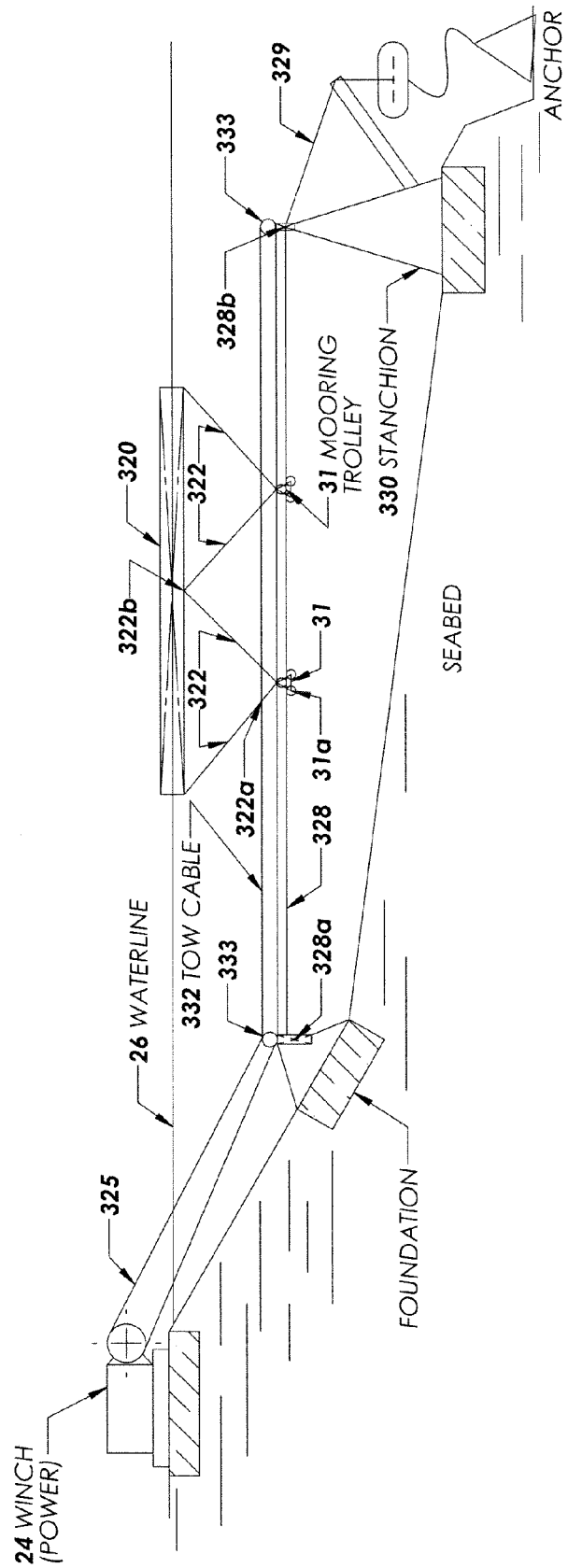
FIG. 3 illustrates an embodiment of the disclosed apparatus that includes a track fixedly mounted under the surface of the water and a tow cable under the water.

In a further embodiment of the present disclosure illustrated in FIG. 3, a track such as a track cable 328 is fixedly mounted under the surface 26 of a body of water, the track cable 328 extending from a first point 328a to a second point 328b for defining a path of motion of a floating or submerged marine structure 320. The track cable 328 is fixed at a depth adequate for vessel passage over it, and tensioned at one end using a tensioning system 329. Stanchions 330 may be used to adapt to various seafloor depths. Riser cables 322 are provided having a first end 322a movably attached to the track cable 328 between the first and second points 328a, 328b, and a second end 322b fixedly attached to the marine structure 320. A mooring trolley 31 is attached to the first end 322a of each of the riser cables 322 between their first end 322a and the track cable 328. Each trolley 31 has at least one roller 31a for engaging track cable 328, and rolls freely along the track cable 328 to distribute environmental forces of the marine structure 320 to the track cable 328.

The apparatus further includes a drive unit attached to the trolleys 31 for moving the trolleys 31 such that the riser cables 322 move between the first and second points 328a, 328b and the marine structure 320 moves along the path defined by the track cable 328. The trolleys 31 that roll along the track cable 328 are moved by a tow cable 332, linking the trolleys 31 to a winch 24 that powers a drive cable 325 that moves the assembly along the track cable 328 with motion and force applied by the tow cable 332. In the embodiment shown in FIG. 3, the tow cable 332 is an endless loop, and a pair of sheaves 333 are rotatably mounted at the first and second points 328a, 328b for movably supporting the tow cable 332. The drive unit is for rotating one of the sheaves 333 for moving the tow cable 328, and comprises a winch 24 fixedly mounted above the surface 26 of the body of water, and a drive cable 325 between the winch 24 and the one of the sheaves 333 for moving the tow cable 328.

In other embodiments, the tow cable 332 is attached to a pair of winches 24, and operate in either direction as the tow cable 332 is wound onto a first one of the winches 24 for moving the trolleys 31 from the first point 328a to the second point 328b, and is wound onto a second one of the winches 24 for moving the trolleys 31 from the second point 328b to the first point 328a. Thus, this configuration is driven using a combination of winches 24 working as power and take up reels. Alternative embodiments include a winch 24 on one end of the tow cable 332 opposing a tug or thruster mounted at the waterline 26 on the marine structure 320. The system "stiffness" can be managed by these opposing tensions.

Dual Tow Cable Configuration

Figure 4A:
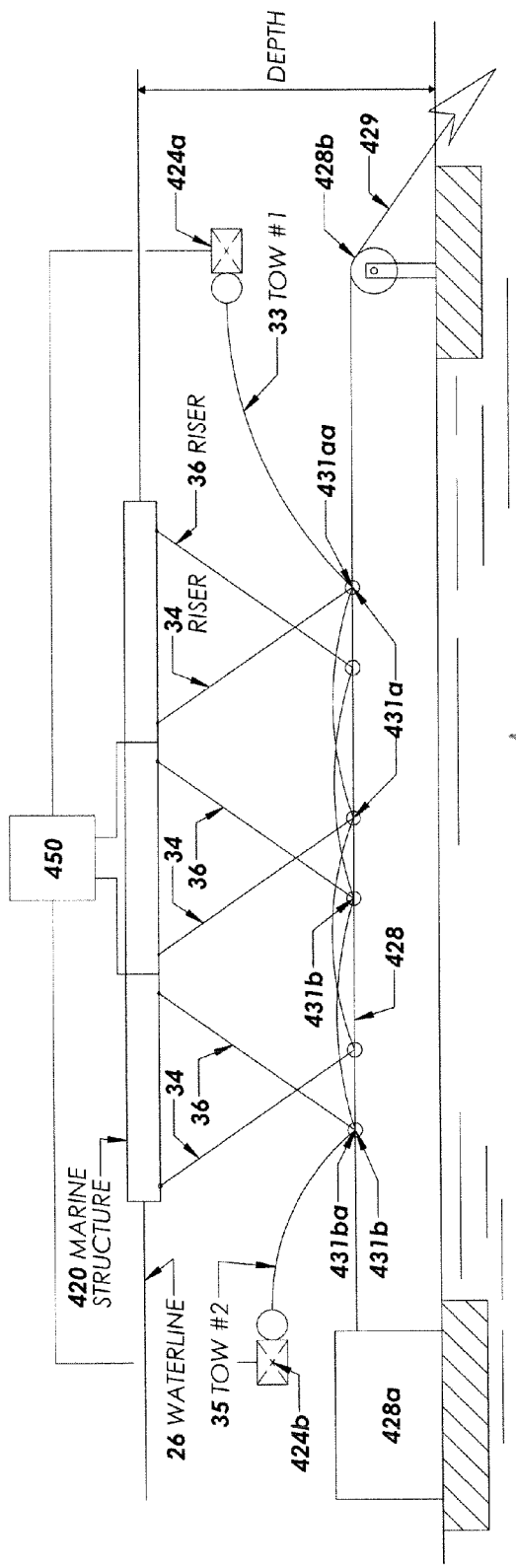
FIGS. 4a and 4b illustrate an embodiment of the disclosed apparatus that includes a track fixedly mounted under the surface of the water and two tow cables pulling in opposite directions along the axis of the track to compensate for tidal variation.
Figure 4B:
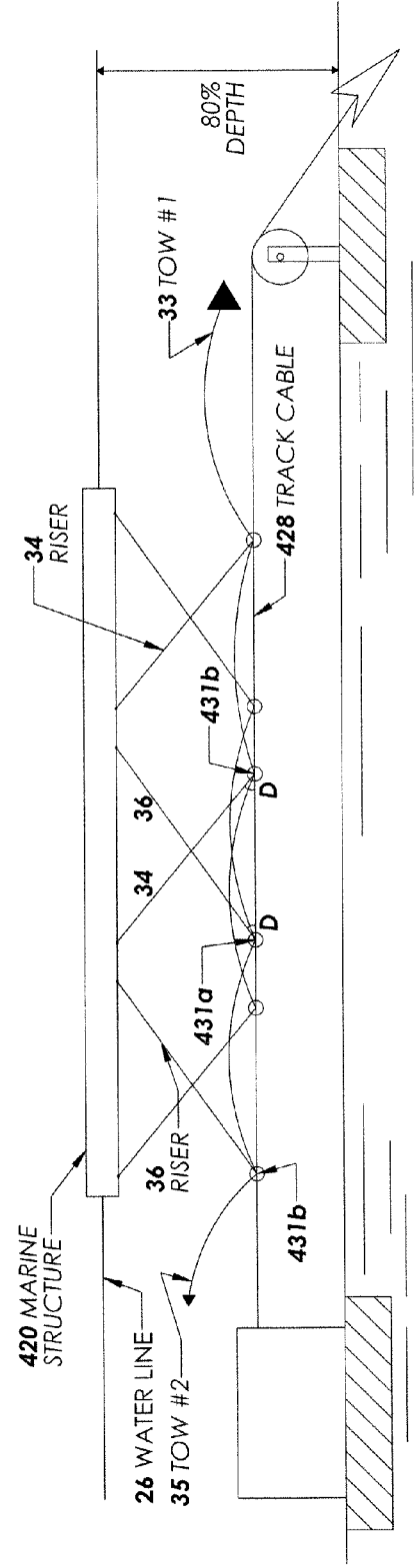

A dual tow cable embodiment of the disclosed apparatus, as shown in FIGS. 4a and 4b, comprises two sets of riser cables and two tow cables pulling in opposite directions along the axis of a track system to compensate for tidal variation.

In this embodiment, a track, such as a track cable 428, is fixedly mounted under the surface 26 of a body of water, the track cable 428 extending from a first point 428a to a second point 428b for defining a path of motion of a floating or submerged marine structure 420. The track cable 428 is fixed at a depth adequate for vessel passage over it, and tensioned at one end using a tensioning system 429. A first set of riser cables 34 each have a bottom end movably attached to the track cable 428 between the first and second points 428a, 428b, and a top end fixedly attached to the marine structure 420. A first trolley 431a is attached to the bottom end of each of the first riser cables 34 between the bottom end and the track cable 428, and has a roller 431aa for engaging the track cable 428 for distributing environmental forces of the marine structure 420 to the track cable 428. A first drive unit 424a, such as a winch, is attached to the first trolleys 431a via a first tow cable 33 for moving the first trolleys 431a in a first direction along the track cable 428.

A second set of riser cables 36 has a bottom end movably attached to the track cable 428 between the first and second points 428a, 428b, and a top end fixedly attached to the marine structure 420. A second trolley 431b is attached to the bottom end of each of the second riser cables 36 between the bottom end and the track cable 428, and has a roller 431ba for engaging the track cable 428 for distributing environmental forces of the marine structure 420 to the track cable 428. A second drive unit 424b, such as a winch, is attached to the second trolleys 431b via a second tow cable 35 for moving the second trolleys 431b in a second direction opposite the first direction along the track cable 428. Hence, the two tow cables 33, are arranged such that tow cable 33 is attached to a towing winch 424a and the first set of risers 34 and trolleys 431a, and tow cable 35 is attached to a braking winch 424b and its second set of risers 36 and trolleys 431b.

A control system 450, such as a computer, uses an algorithm in a conventional manner to control the first and second drive units 424a, 424b, responsive to a measured tension in each of the first and second riser cables 34, 36, such that the riser cables 34, 36 move between the first and second points 428a, 428b and the marine structure 420 moves along the path defined by the track cable 428 in one of the first direction and the second direction. Control system 450 uses the measured tension and algorithm to control the drive units 424a, 424b to balance opposing loads and achieve a bias in one direction to move the marine structure 420 along the track cable 428.

FIGS. 4a and 4b illustrate how the dual tow cables 33, 35, working in opposite directions, pull the riser cables 34, 36 to adjust for the change in water depth. The change in angles of the risers 34, 36 relative to the track cable 428 results from a change of the depth distance from marine structure 420 to fixed underwater track cable 428, thus compensating for tidal variation. Up to 40% of the depth can be adjusted for by changing the angles of the riser cables 34, 36 from 60 degrees to 30 degrees relative to the track cable 428, as shown in FIGS. 4a and 4b, respectively.

Surface Track Cable Configuration

Figure 13A:
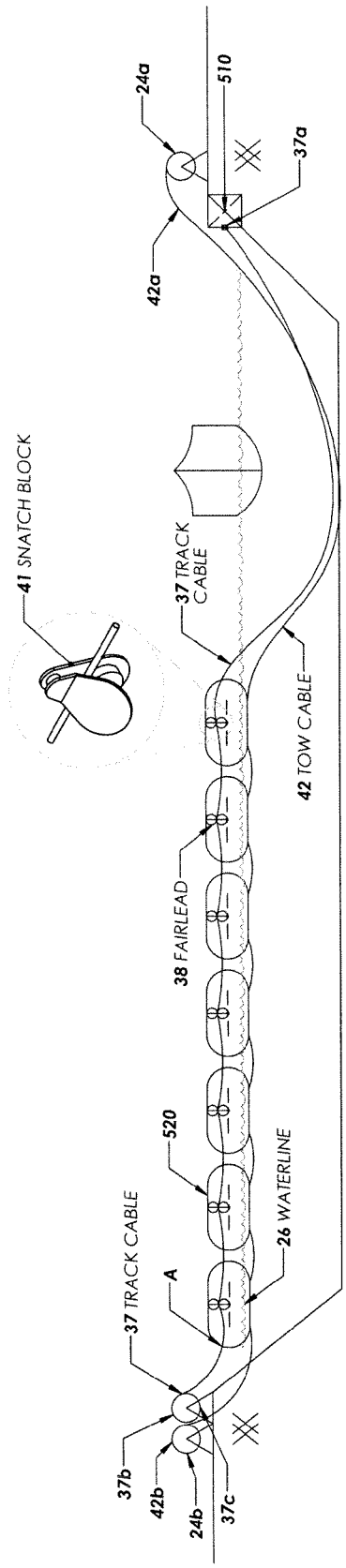
FIGS. 13a-c illustrate an embodiment of the disclosed apparatus that includes a track cable and a tow cable at the waterline.
Figure 13B:
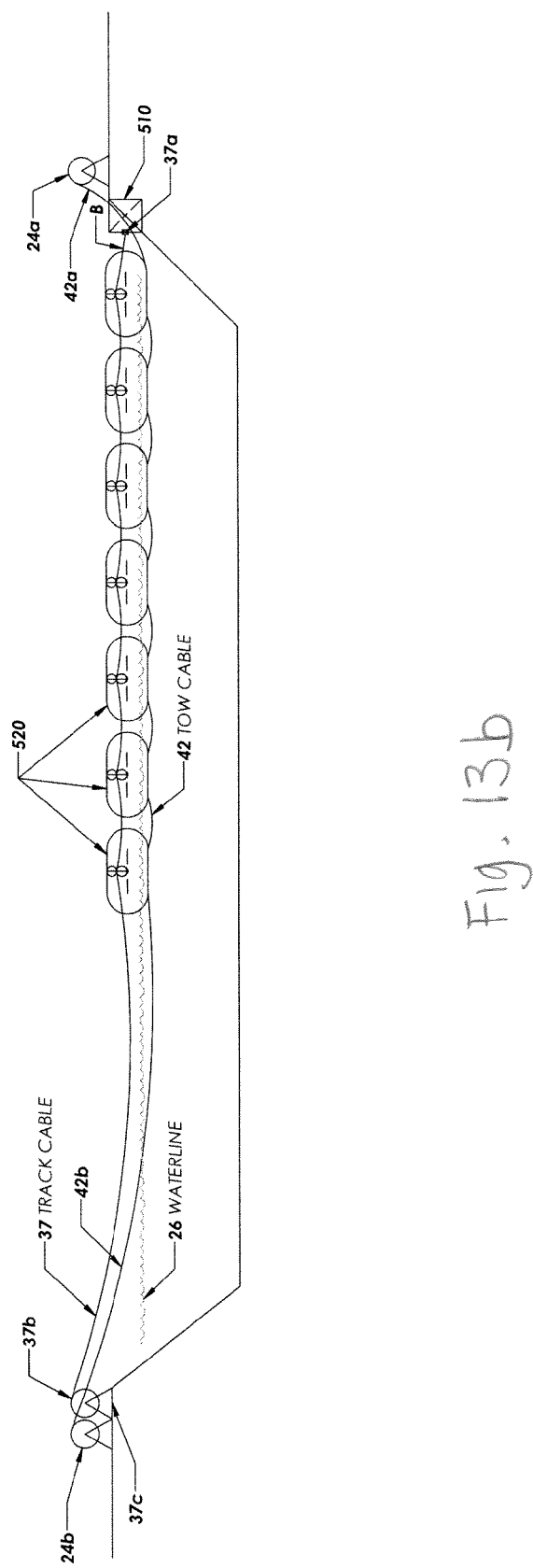
Figure 13C:
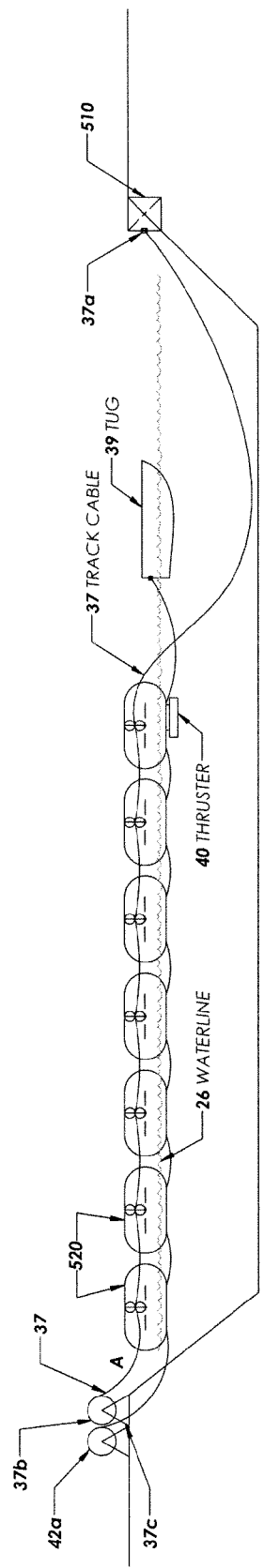

A surface track cable embodiment of the disclosed apparatus is illustrated in FIGS. 13a-c. A track cable 37 passes through one or more conventional fairleads 38 in or attached to floating segments of a marine structure 520. No risers are present in this configuration. The structure 520 is moved from point to point on the track cable 37 via a tow cable 42a, and must be of sufficient buoyancy to support the track cable 37. Track cable 37 and tow cable 42a can be allowed to sink to shallow seabed depths after the marine structure 520 is moved out of the way, as shown in FIG. 13a, thus allowing vessel passage over the track cable 37 and tow cable 42a. As the marine structure 520 is moved back, its lead end has sufficient buoyancy to lift the track cable 37 up from below the waterline surface 26, as shown in FIG. 13b. The floating marine structure 520 can be moved by a tug 39, or be self-powered with thrusters 40 (see FIG. 13c).

Thus, the apparatus of this embodiment comprises a track cable 37 extending from a first point A to a second point B for defining a path of motion of the marine structure 520 at the surface 26 of a body of water, the track cable 37 having first and second opposing ends 37a, 37b, the first point A and the second point B being between the first and second opposing ends 37a, 37b. A roller, such as fairlead 38, is attached to the marine structure 520 for movably engaging the track cable 37. A fixed track cable mount 510 is attached to the first end 37a of the track cable 37, and a track cable drive unit 37c, such as a conventional winch, is attached to the second end 37b of the track cable 37 for moving the track cable 37 between a first position where the track cable is proximal the surface of the body of water (as shown in FIG. 13b), and a second position where a portion of the track cable is under the surface of the body of water (as shown in FIGS. 13a and c). A marine structure drive unit, such as first tow cable 42a and first winch 24a, is attached to the marine structure 520 for moving the marine structure 520, when the track cable 37 is in the first position, such that the roller 38 moves between the first and second points A, B, and the marine structure 520 moves along the path.

First winch 24a is also for adjusting the position of the tow cable 42a between a first position where the tow cable 42a is proximal the surface of the body of water and a second position where a portion of the tow cable 42a is under the surface of the body of water (see FIG. 13a), allowing the passage of a vessel. In the embodiment of FIGS. 13a-b, a second tow cable 42b and second winch 24b have the same functionality as first tow cable 42a and first winch 24a. FIG. 13c shows alternative embodiments where a tug 39 with a tow cable, or a thruster(s) 40, takes the place of one of the tow cables 42a, b in the marine structure drive unit.

In operation, if the marine structure 520 is to be moved, the track cable 37 is moved to its first position at the waterline 26 by winch 37c, then one of the tow cables 42a, 42b is wound onto its winch to move the marine structure 520. The track cable 37 and the tow cable 42a, 42b are then allowed to sink to the seabed to allow passage of a vessel as shown in FIG. 13a.

The marine structure 520 contains one or more conventional fairleads 38 or sheaves that allow the structure 520 to ride smoothly on the track cable 37. In certain embodiments, snatch block 41 style sheave assemblies, as shown in FIG. 13a, having removable side plates are used, enabling parts of the floating marine structure 520 to be removed from the middle of the track cable 37 and replaced. The fairleads 38 or sheaves must carry the loads of wind, waves and current that are collected by the marine structure 520 and transfer those loads to the track cable 37. This enables the tug 39 or thruster 40 to primarily carry the loads from fluid drag and inertia of the marine structure 520 in the movement of the marine structure 520 along the track cable 37. The system is completed with a tow cable 42a that moves the structure 520 in an opposing direction from the thrusters 40, or with a second tow cable 42b to move opposite tow cable 42a.

Curtain Gate Configuration

Figure 14A:
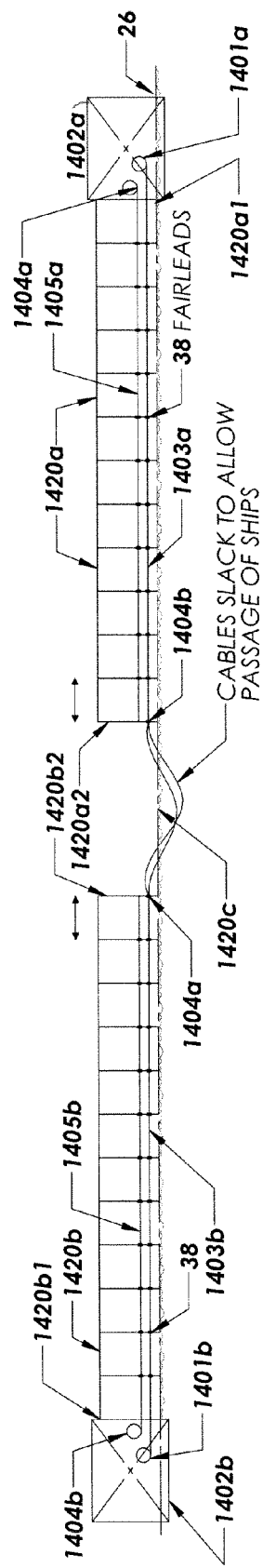
FIGS. 14a-b illustrate a curtain gate embodiment of the disclosed apparatus.
Figure 14B:
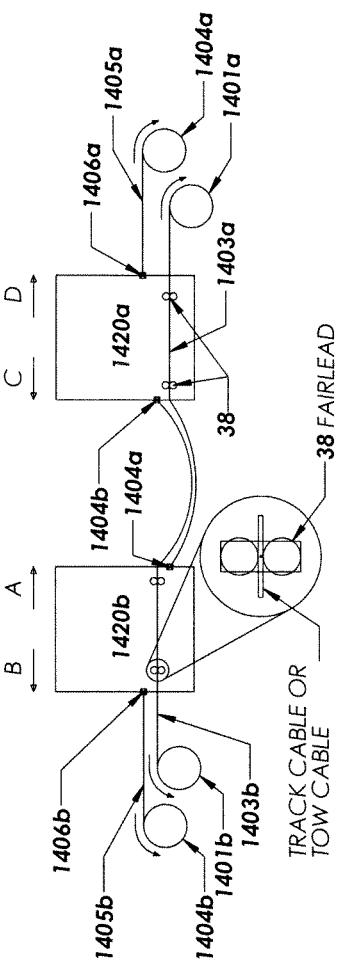

An embodiment of the disclosed apparatus featuring a dual action gate is depicted in FIGS. 14a-b, where a pair of floating marine structures 1420a, 1420b are moved in opposing directions, either from the ends to the center to close the gate, or from the center toward the ends to open the gate. This embodiment has cables that act as both track and tow. As shown schematically in FIG. 14b, winches 1401a and 1401b work together to draw the structures to the center, in the direction of arrows A and C. The tow cable 1403a of the right side becomes the track cable 1403a of the opposing left side as the cable 1403a is drawn through fairleads 38 of one of the marine structures 1420a. Each side has a separate retraction cable 1405a, 1405b that pulls each side away from the center outward toward the ends, as winches 1404a and 1404b work together to draw the structures 1420a, 1420b apart.

Thus, an apparatus according to this embodiment comprises a first tow/track cable drive unit, such as a winch 1401a, mounted at a first fixed point 1402a, and a first tow/track cable 1403a having a first end attached to the first tow/track cable drive unit 1401a. The first tow/track cable 1403a extends along an axis of a first marine structure 1420a, is movably attached to the first marine structure 1420a, as by a roller 38 for movably engaging the first tow/track cable 1403a, and has a second end 1404a fixedly attached to a second marine structure 1420b. A second tow/track cable drive unit, such as a winch 1401b, is mounted at a second fixed point 1402b opposite the first fixed point 1402a, and a second tow/track cable 1403b has a first end attached to the second tow/track cable drive unit 1401b. The second tow/track cable 1403b extends along an axis of the second marine structure 1420b, movably attached to the second marine structure 1420b, as by a roller 38 for movably engaging the second tow/track cable 1403b, and has a second end 1404b fixedly attached to the first marine structure 1420a.

The first tow/track cable drive unit 1401a is for moving the first tow/track cable 1403a between a first position where the first tow/track cable is proximal the surface 26 of the body of water and a second position where a portion of the first tow/track cable is under the surface 26 of the body of water (see FIG. 14a). Similarly, the second tow/track cable drive unit 1401b is for moving the second tow/track cable 1403b between a first position where the second tow/track cable 1403b is proximal the surface 26 of the body of water and a second position where a portion of the second tow/track cable 1403b is under the surface 26 of the body of water (see FIG. 14a).

The first tow/track cable drive unit 1401a is also for moving the first tow/track cable 1403a to move the second marine structure 1420b towards a central point 1402c between the first and second fixed points 1402a, 1402b when the second tow/track cable 1403b is in its first position; and the second tow/track cable drive unit 1401b is for moving the second tow/track cable 1403b to move the first marine structure 1420a towards the central point 1402c when the first tow/track cable 1403a is in its first position. In other words, each of the tow/track cables tows one of the marine structures, and acts as the track of the other one of the marine structures to move both structures towards the central point.

The apparatus further comprises a first retract cable drive unit, such as a winch 1404a, mounted proximal the first fixed point 1402a, and a first retract cable 1405a having a first end attached to the first retract cable drive unit, and having a second end fixedly attached to the first marine structure 1420a. Likewise, a second retract cable drive unit, such as a winch 1404b, is mounted proximal the second fixed point 1402b, and a second retract cable 1405b has a first end attached to the second retract cable drive unit 1404b, and a second end fixedly attached to the second marine structure 1420b. The first retract cable drive unit 1404a is for moving the first retract cable 1405a to move the first marine structure 1420a away from the central point 1402c and towards the first fixed point 1402a; and the second retract cable drive unit 1404b is for moving the second retract cable 1405b to move the second marine structure 1420b away from the central point 1402c and towards the second fixed point 1402b.

In the exemplary embodiment shown in FIG. 14a, the first and second marine structures 1420a, 1420b are each expandable and retractable along a longitudinal axis in a direction of the double-headed arrows. The first marine structure 1420a has an inner end 1420a1 attached proximal the first fixed point 1402a and an outer end 1420a2 opposite the inner end 1420a1 along its longitudinal axis, and the second marine structure 1420b has an inner end 1420b1 attached proximal the second fixed point 1402b and an outer end 1420b2 opposite the inner end 1420b1 along its longitudinal axis. The first tow/track cable 1403a extends along the longitudinal axis of the first marine structure 1420a, and its second end 1404a is fixedly attached to the outer end 1420b2 of the second marine structure 1420b, and the second tow/track cable 1403b extends along the longitudinal axis of the second marine structure 1420b, and its second end 1404b is fixedly attached to the outer end 1420a2 of the first marine structure 1420a. The first tow/track cable drive unit 1401a is for moving the first tow/track cable 1403a to expand the second marine structure 1420b towards the central point 1402c, and the second tow/track cable drive unit 1401b is for moving the second tow/track cable 1403b to expand the first marine structure 1420a towards the central point 1402c. The first retract cable drive unit 1404a is for moving the first retract cable 1405a to retract the first marine structure 1420a away from the central point 1402c and towards the first fixed point 1402a; and the second retract cable drive unit 1404b is for moving the second retract cable 1405b to retract the second marine structure 1420b away from the central point 1402c and towards the second fixed point 1402b.

This embodiment has one or more fairleads 38 in or attached to the marine structures 1420a, 1420b which enable the smooth movement of the marine structures along the track/tow cable of each side. The operating principle that these track and tow cables 1403a, 1403b can sink to the seabed when the structures 1420a, 1420b are retracted toward each end with retraction cables 1405a, 1405b, and allow vessel passage over them, enables this system to function as a marine gate. The result is similar to hangar doors moved apart to allow passage.

This embodiment can be comprised of multiple structures linked together that festoon to open and close off access to piers and channels. The design can also manage the expansion or contraction of floating structures that nest together in line when contracted, and spread apart when expanded along the track cable.

Subsystems of the Disclosed Apparatus

The disclosed apparatus, depending on its configuration, may have the following primary systems, each of which can be considered a subsystem of the apparatus and have individual variations of each subsystem component to accommodate special conditions or various configurations:

Riser Cable Subsystem

The riser subsystem is the multiple cable connection between the floating marine structures at or just below the water surface and the underwater moving components of this apparatus. The risers (reference numerals 22, 222, 322, 34, 36) are common to all configurations of the apparatus. The riser system transfers the environmental loads that act on the floating marine structures down to the transport cable 21 or to the trolleys 27, 31, 431 riding on a track system (such as track cable 28, 328, 428).

Figure 5:
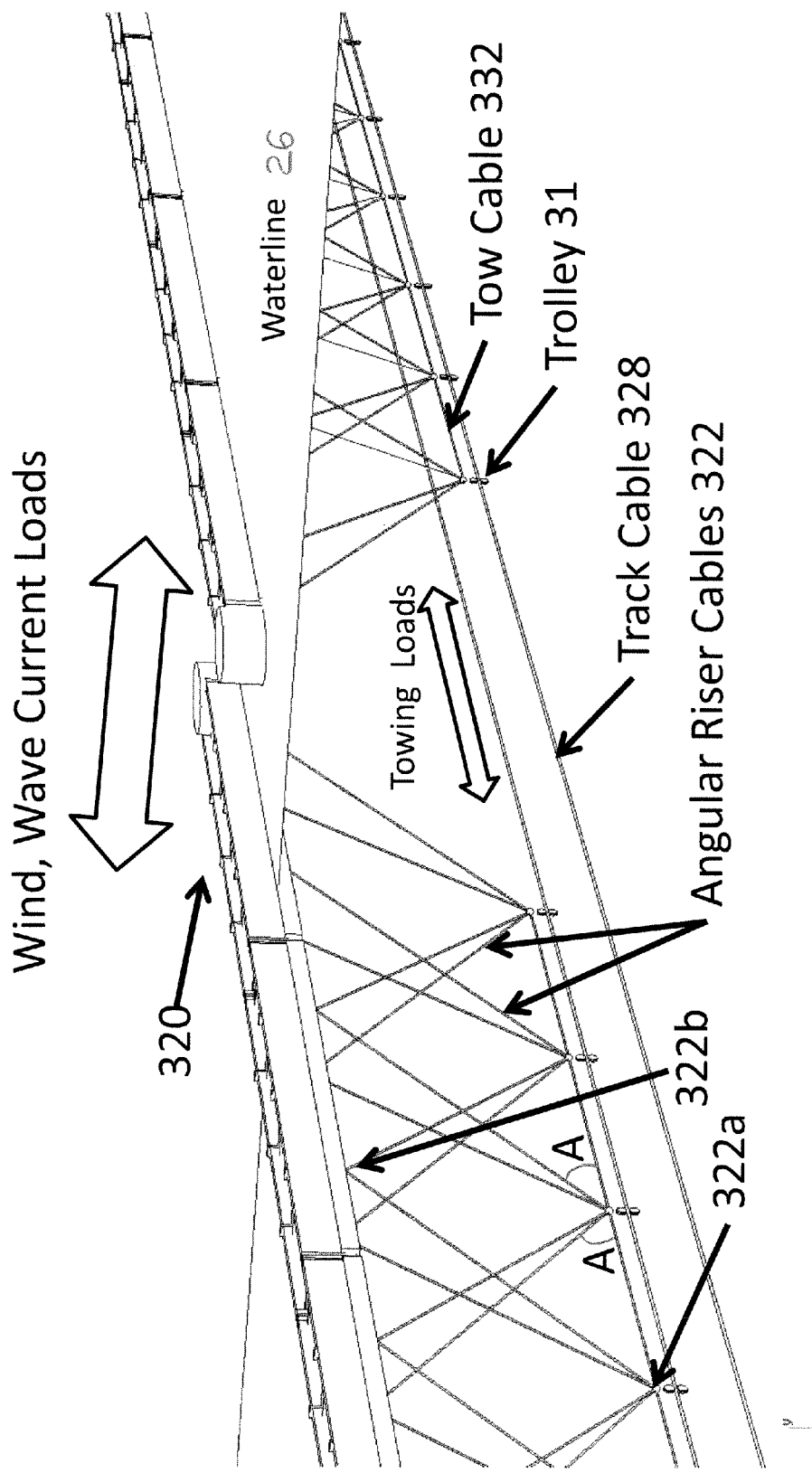
FIG. 5 illustrates a configuration of riser cables according to an embodiment of the present disclosure.

In certain embodiments of the disclosure, riser cables are at matched opposing angles to the transport cable or track and tow cable. This angular riser design transmits components of the towing force and of the restraining forces at the same time. This principle is applied in all riser systems 22, 222, 322, 34, 36 of this apparatus. For example, FIG. 5 is a perspective view of the apparatus of the embodiment of FIG. 3, and shows pairs of riser cables 322 with their first ends 322a attached to a trolley 31 and their second ends 322b attached to separate points of the marine structure 320 such that they respectively form substantially equal opposing angles A with the track cable 328. An analogous arrangement is shown in FIG. 2, wherein pairs of riser cables 222 with their first ends 222a attached to each other at a trolley 27 and their second ends 222b attached to separate points of the marine structure 220 such that they respectively form substantially equal opposing angles B with the track cable 28.

Likewise, in certain embodiments the transport cable configuration of FIG. 1 has a pair of the riser cables 22 attached to the riser attachment point 23, the riser cables 22 being attached to separate points of the marine structure 20 such that they respectively form substantially equal opposing angles C with the transport cable 21.

As shown in FIG. 4b, in certain embodiments each of the first and second riser cables 34, 36 are attached to separate points of the marine structure 420 such that they respectively form substantially equal opposing angles D with the first and second trolleys 431a, 431b.

The riser subsystem 22, 222, 322, 34, 36 can also have elastic members or portions of the risers made from elastic materials in order to dampen the heaving motion of the floating structures. With longer lengths of marine structures, the riser system can have strategically placed risers of differing mechanical properties to further dampen system motion. The risers 22, 222, 322, 34, 36 can be chain, wire or fiber rope, and are sized for the combined loads of towing and restraint to the trolleys 27, 31.

The riser subsystem 22, 34, 36 can have customized connections to affix nets or partially submerged structures such as underwater sensors and security devices.

Transport Cable Subsystem

The transport cable subsystem used in the embodiment of FIG. 1 includes a winch or winches 24 situated on fixed features above the waterline 26 such as piers, breakwaters or dolphins with foundations of sufficient load bearing capacity to transmit the forces of moving the floating or submerged structure(s) 20. To transmit the force from above the water down to the transport cable, an endless loop drive cable and pulleys is required. The drive cable 25 is shown in FIG. 1. The transport cable subsystem also includes sheaves 31 and fixed seabed foundations to support the connections of driving cables 25 to the sheaves 31 or drums that power the endless loop configuration shown in FIG. 1.

The transport cable subsystem includes a conventional tensioning system 29 needed to achieve a prescribed tension in the endless loop. The transport cable 21 and its sheaves, drums, bearings and connections to the seabed foundations are designed to have sufficient load bearing capacity to carry the environmental loads of wind, current, and waves applied on the floating or submerged structure(s) 20 being moved by the apparatus.

The transport cable subsystem uses fiber or wire ropes for drive cable 25 and transport cable 21 of a design to accommodate the loads and subsurface environment in which the apparatus operates, and to be capable of winding onto winch drums, take up reels, or sheaves.

When the apparatus of FIG. 1 is used to move a net system, the transport cable 21 can have the bottom edges of nets (not shown) attached to it using similar connections as when the nets are connected to risers 22.

Trolley Subsystem

Embodiments of the disclosed apparatus that include a fixed track or track cable, as shown in FIGS. 2, 3, and 4a-b, have a subsystem of a trolley or trolleys 27, 31, 431a-b that slide or roll along the fixed track (such as track cable 28, 328, 428). There are two styles of trolley: a trolley 27 which is not connected to a power source, and a mooring trolley 31, 431a-b which is connected to a tow cable 33, 35, 332. The trolleys 27, 31, 431a-b enable smooth guided movement along the track. The trolley(s) 27, 31, 431a-b are the link between the riser subsystem and the track or track cable. Each trolley 27, 31, 431a-b contains a single or multiple rollers or sheaves and can be configured to ride on a track or on a track cable. The function of a trolley is to evenly distribute the environmental forces of the marine structure(s) to the track or track cable.

Sizes and numbers of rolling elements are designed as needed for each specific apparatus and its unique conditions of environmental loads from the marine structures it carries. The rolling bearing elements can be composite or bronze and designed to wear sacrificially to the track system and be easily replaced.

For smooth operation over a length of time, features that scrub fouling from the track or track cable can be added to the leading and trailing edges of the trolley(s) 27, 31, 431a-b.

In the embodiment of the apparatus shown in FIG. 3, having both tow cable 32 and track system (track cable 328), the trolley 31 has a fixed clamp connection to the tow cable 32. If multiple trolleys 31 are used in the apparatus, each trolley 31 is connected to the tow cable 32. When the tow cable 32 drives movement in the apparatus, the trolley 31 or all of the trolleys 31 move in unison.

In the dual tow cable embodiment of FIGS. 4a-b that accommodates tidal variation, pairs of trolleys 431a-b or sets of pairs of trolleys 431a-b are used in opposing directions with winch 24 pairs that create some braking in the system as it is being pulled in one direction. The angles of the riser cables 34, 36 in the system begin to flatten out, pulling the marine structure 420 over the top center of the track cable 428. As the tide rises and falls, the buoyancy of the marines structure 420 will pull against the braking tension, forcing lateral centering of the structure over the track cable 428.

Figure 6:
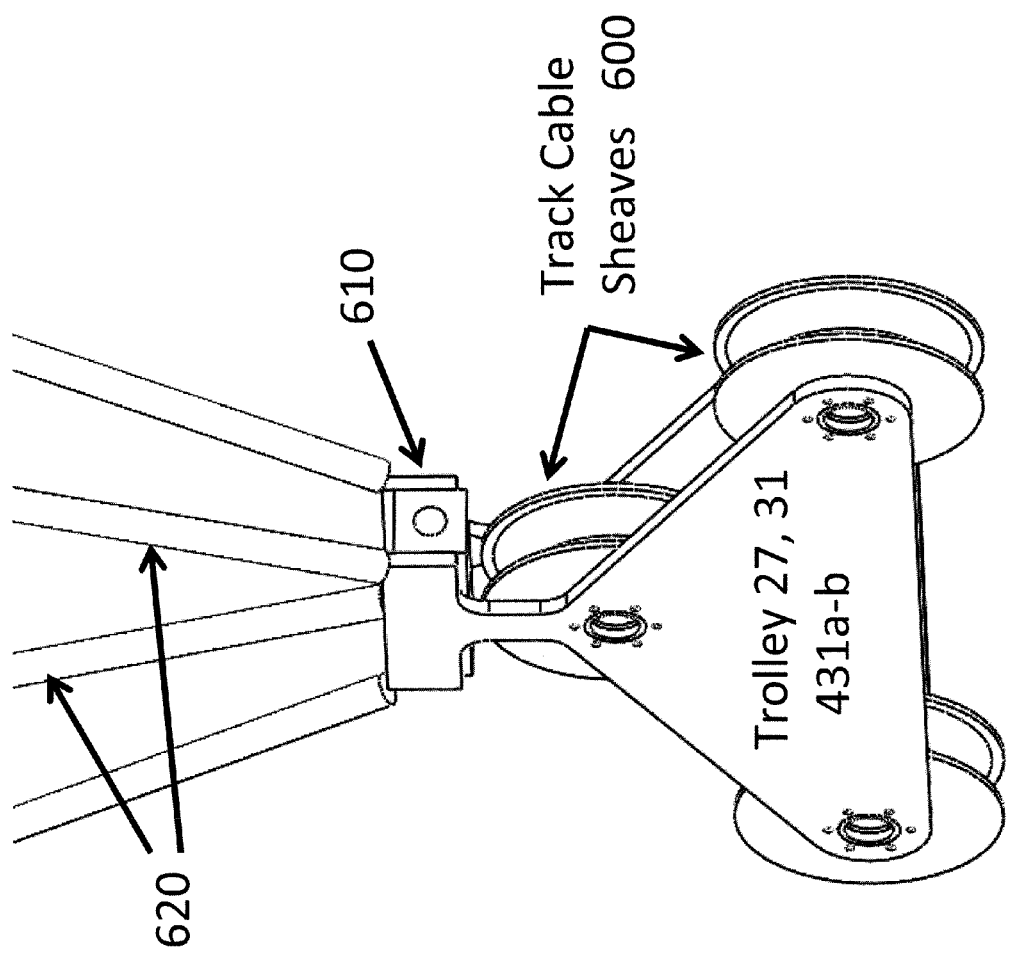
FIG. 6 illustrates a trolley for use with embodiments of the present disclosure.

Referring to FIG. 6, an example of a trolley 27, 31, 431a-b has a plurality of sheaves 600 for respectively engaging the top and bottom of a track or track cable, and a tow cable clamp 610 for connecting a tow cable. Riser cables 620 are attached to the top of the trolley Track or Track Cable Subsystems The embodiments of the disclosed apparatus that use a trolley 27, 31, 431a-b also use a fixed track, such as a track cable 28 or a plurality of track cables, for the trolley to ride on. The track or track cable(s) is a fixed distance below the waterline 26 and always parallel to the waterline 26. The track subsystem consists of either a fixed track component or a track cable or cables, and its foundations and tensioning devices. This subsystem restrains all of the broadside and angular loads from environmental forces exerted on the marine structures.

Figure 7:
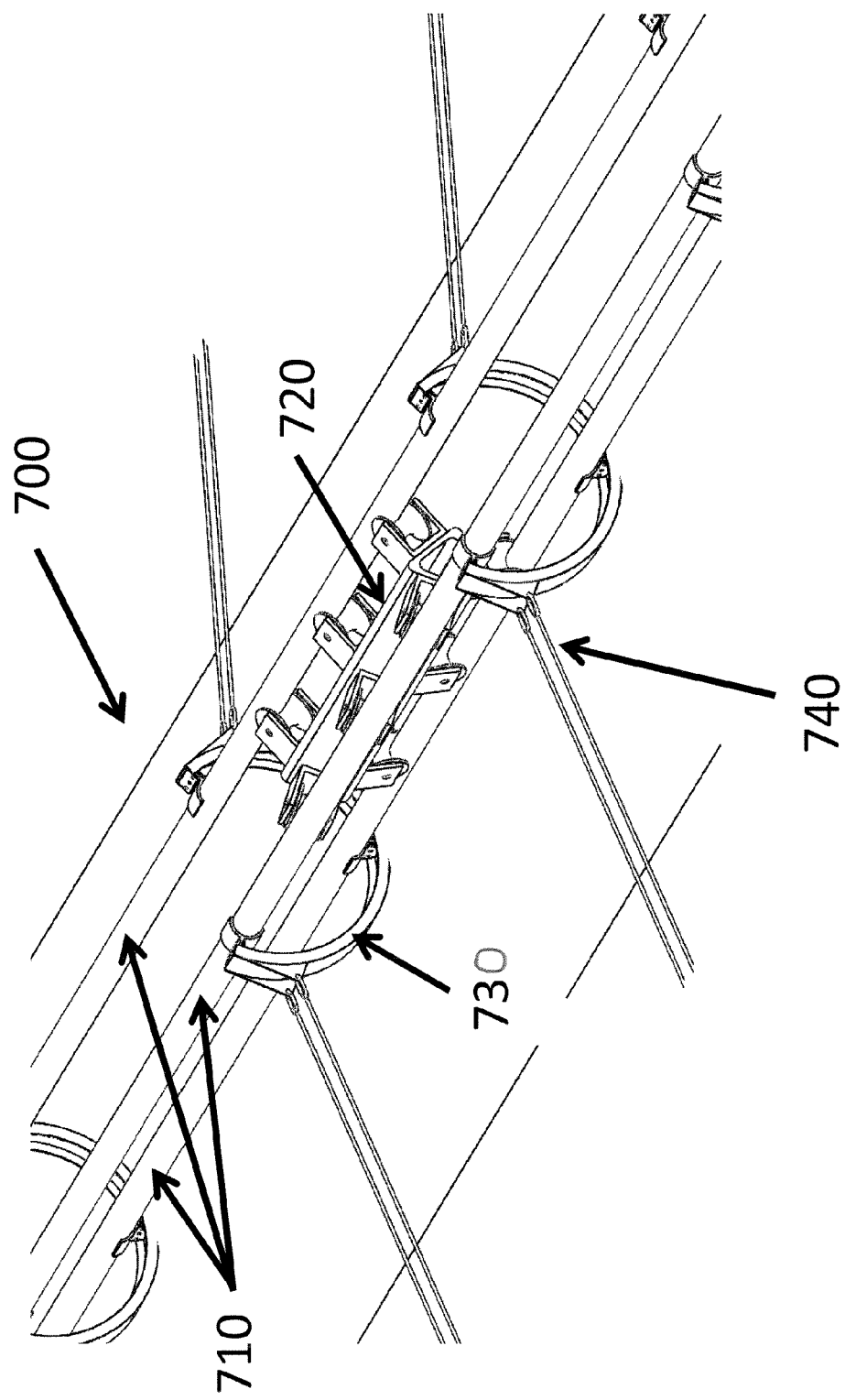
FIG. 7 illustrates a track according to an embodiment of the present disclosure.

Certain embodiments of the apparatus that use trolleys have a tri-rail track 700 shown in FIG. 7 instead of a track cable or cables. The tri-rail track system 700 can be a group of multiple rails, such as three rails 710. The system 700 includes an inner trolley 720 and outer rails 710 design. Those skilled in the art will realize the reverse is also possible; i.e., an outer trolley and inner rails design. Cross-members 730 are provided at short pitch regular intervals, keeping the structure rigid in cross section so the trolley 720 cannot pull out and cause the rails 710 to separate. The assembly 700 can be moored at regular intervals down its length with anchor legs 740 primarily perpendicular to the system axis. In one embodiment, rails 710 each comprise a pultruded pipe with heavy studlink anchor chain running thru the pipe, and rigid composite cross-members 730 provide the mooring connection points.

The track cable or cables used in the embodiments of FIGS. 2 and 3 can be a fixed wire rope system connected only at each end, in a true catenary-style cable (see track cables 28, 328 in FIGS. 2 and 3). Very high loads can occur in the tensioning of such a system, and are required to keep the slack to a minimum amount. Therefore, in the embodiments of FIGS. 2 and 3, one end of the track cable 28, 328 is fixed, and the opposite end has a conventional tensioning device 229, 329. The track cable or cables 28, 328 are designed to carry the rolling load of the trolleys 27, 31 in a marine underwater environment.

Track 700 or track cable components 28, 328 can be built on stanchions 30, 330 to support the track system parallel to the waterline surface 26, and are designed to accommodate an irregular seabed. As necessary near the shoreline, dredging will be required to support structural foundations installed at the same depths as rest of the track system. In most cases tow cable 332 foundations and track system tension foundations can be the same structure (see FIG. 3).

Tow Cable and Winch Subsystems

In certain disclosed exemplary embodiments, the tow cable 20b, 332 and the risers 222, 322 operate with some tension, as to not have slack in either the tow or riser system. The winch 24 is required to move the structure along the track system (e.g., track cable 28, 328) and pairs of winches 24 may operate as a tow and brake combination working from either end in the embodiment of FIG. 2. In other words, a fixedly mounted winch 24 takes the place of tug 20a in FIG. 2. A single-ended winch system is also contemplated, but requires the marine structure 220 to have thrusters or an attached tow vessel 20a to move the structure 220 at the surface in the opposite direction of the winch 24.

In certain embodiments, the winch 24 will operate from above the waterline 26, mounted onto a rigid pier, breakwater or dolphin. In the embodiment of FIG. 3, winch 24 delivers force in line at the tow cable 332 axis, and transmits the force from above the water down to the tow cable 332 via an endless loop drive cable 325 and pulleys. In all cases the subsystem component parts are designed to operate the apparatus in any weather the mission of the system dictates, and withstand the forces required to accelerate, move and decelerate the marine structure's motion along the axis of the tow cable 332 and track cable 328 (or any other type of track system).

In embodiments where the track and tow cables 37, 42a-b, 43, 44 are slackened to sink to the depth required to allow safe passage of vessels over them, the winch 24 will have a traction device to maintain tension of the cable onto the winch drum, and to effectively pay out the cable through the fairleads 38 of the marine structure 520, 1420 as the marine structure(s) are retracted out of the way of passing vessels.

Fairlead Subsystem

Embodiments of the apparatus such as shown in FIGS. 13a-c where the track cable 37 is raised to the waterline 26 and no risers are present, will use fairlead 38 components to guide the track cable 37 through or adjacent to the marine structure 520. See also FIGS. 14a-b. There may be several fairlead roller devices 38 on each marine structure 520 such that parallel tracking motion is maintained as the marine structures move along the track cable 37. The fairlead 38 may have snatch block 41 style sheaves (see FIG. 13a) such that units of the marine structure 520 may be removed from the track cable 37.

Applications of the Apparatus

The disclosed apparatus can perform a wide variety of marine tasks that involve repeated movement of a marine structure, float, or net from point to point on the water, and allow for vessels to pass over the track or transport system. Specific industries may prefer one of the configurations over another, for reasons that suit the application. The engineering for size, capacity, and function of the apparatus(es) for any particular application is site specific, as the marine environment, be it salt water or fresh water, and the seabed, river bed, or lake bottom and its soil conditions found there are unique for each site. These conditions and the fact that different industries have preference for certain configurations will produce a large number of possibilities of arrangements of the apparatus, as those skilled in the art will appreciate.

Application of the Disclosed Apparatus to Operate a Marine Gate

Coast Guards and Marine Patrols are responsible for keeping vessel traffic from excluded areas on the water by deploying lines of demarcation or floating water barriers or fences. Current technology requires obtaining service boats and people to manually operate the access gates of those systems. Thus, every time a gate is opened or closed, it involves people and vessels who are either paid to be on standby or who must be interrupted from their other tasks. There is anecdotal evidence that gates or barriers that should be in place are simply left open or unused with both port captains and the operators of the service vessels frustrated with the clumsy operation of currently available equipment. Security and marine patrol officers have mandates to keep random boat traffic away from certain areas as a matter of safety of the boaters. Military ports and harbors also need to restrict access to the public, but have operational access to their berths. Therefore, effective operational gates are required. Gate systems as enabled by the presently disclosed apparatus, that can be deployed with less effort, have the potential for widespread use.

Figure 8:
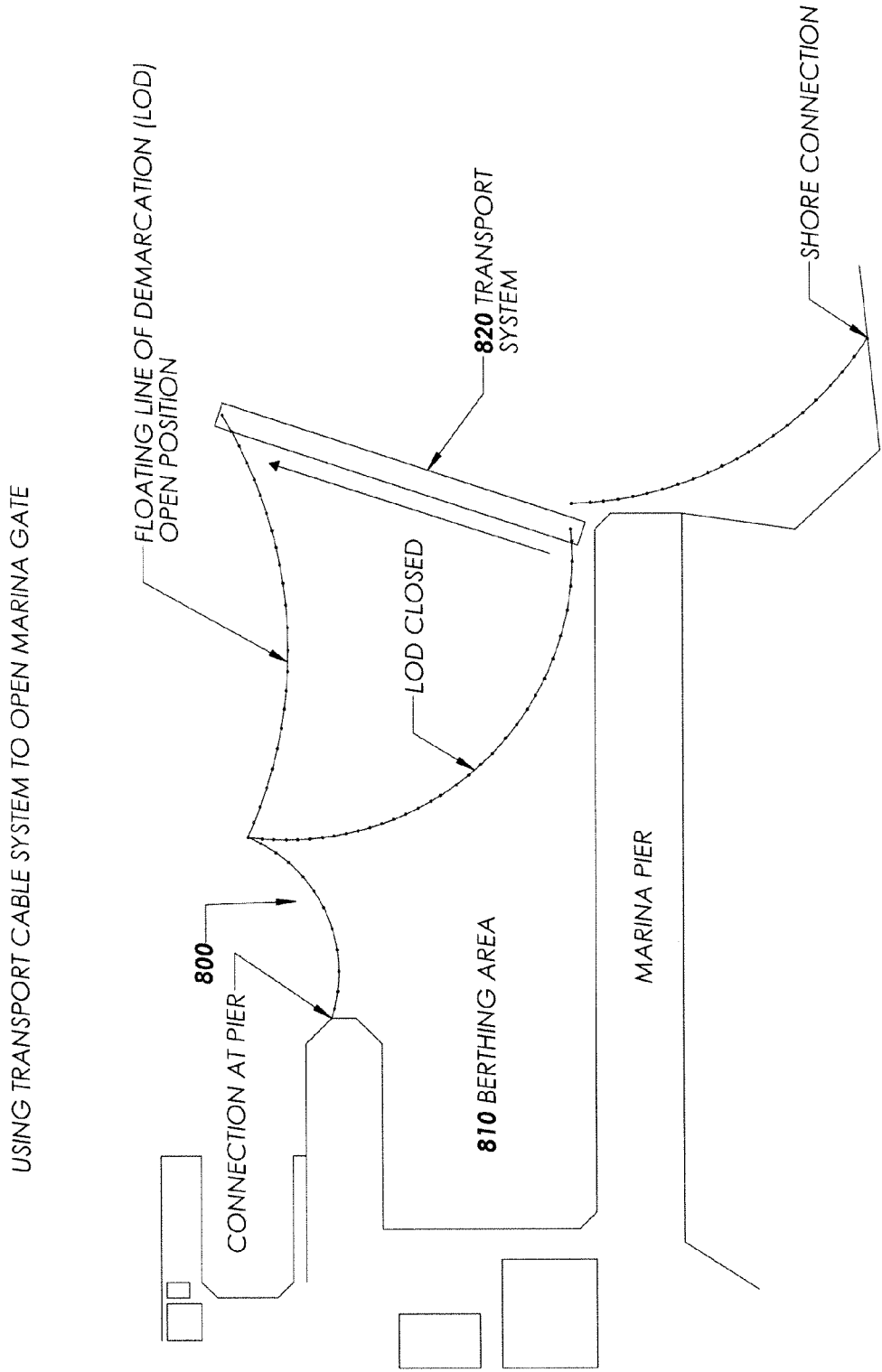
FIG. 8 illustrates an application of the apparatus of the present disclosure to operate a marine gate.

FIG. 8 shows the opening and closing of a line of floats 800, commonly called a "Line of Demarcation (LOD)". This arrangement may be used to close off a secured exclusion zone, a private marina 810 or scuba diving area, using the transport cable configuration 820 of FIG. 1 to open and close one end of the LOD 800, enabling vessel passage in and out of the closed area 810. The configuration of FIG. 1 is advantageous in this situation because it is simple enough to be installed for short term use; for example, at a waterfront construction site, and has a low enough cost enough to be considered for use by private owners.

Application of the Disclosed Apparatus to Move Pontoons

Figure 9:
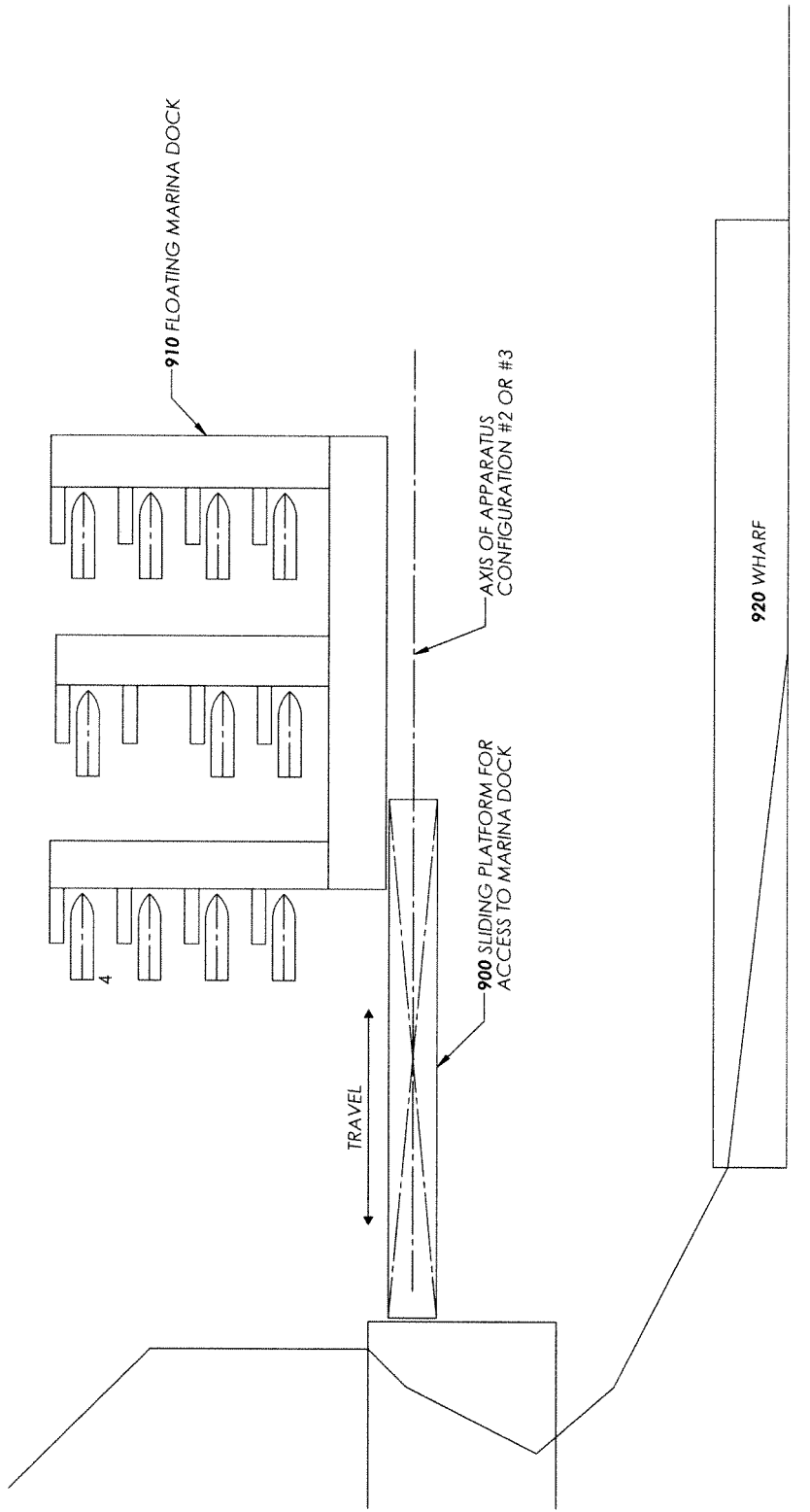
FIG. 9 illustrates an application of the apparatus of the present disclosure to move a marina pontoon.

FIG. 9 depicts the movement of a marina pontoon 900 to enable access to a nest of docks 910 positioned a short distance from a pier or quay wall 920. This design can benefit densely packed marinas. The trolley guided configurations of the apparatus shown in FIG. 2 and FIG. 3 are well-suited for this application, allowing for guided in-line motion of the pontoon 900, so that vessels can pass over the apparatus. In such an embodiment, pontoon 900 is the marine structure 220 or 320, and the remainder of the components shown in FIGS. 2 and 3 are basically unchanged. With multiple trolley connections tethering the pontoon 900 to the track system below, the pontoon 900 and its motions will stay in-line, even in heavy weather. Depending on the site and installation design, the apparatus can be powered by winches and operated by the user, enabling access to moored boats without requiring a launch or tender.

Arrangement for Aquaculture

There are certain instances where repeated point to point movement on the water can benefit aquaculture operations. Fish farms are found in fresh water and coastal ocean locations, and usually located close to shoreline for accessibility. The farms consume tons of fish food, and regular automated delivery to the moored farm from the shoreline is possible with the tow cable apparatus configuration of the apparatus of FIG. 3. Such an arrangement is shown in FIG. 10, wherein a food supply 1000 (which is the marine structure 320 of FIG. 3) is movable between a pair of net pens 1010 and the shore line 1020 via the tow and track cable system 1030 (which is the apparatus of FIG. 3).

Other exemplary uses of the disclosed apparatus in aquaculture are to deploy and retract gill net panels, or to enable cage groups to move along a track system where their movement prevents concentrations of food and wastes from polluting one location.

Arrangements for Military Ports and Harbors

Several types of floating structures are used to secure closed ports at naval bases and critical infrastructure supply ports. Many sites have long strings of floating fenders or U.S. Navy-designed "Port Security Barriers," arranged in a full perimeter from shoreline to shoreline around a sensitive facility. Generally, strings of 50 foot long barriers are connected to mooring buoys typically spaced from 200 to 800 feet apart, forming a catenary between each mooring buoy. FIG. 8 shows such a catenary formation.

The Port Security Barrier (PSB) is a line of floats, like the LOD of FIG. 8, but further includes a substantial frame and net structure, which have considerably more mass and operate with higher closure loads than a LOD. The disclosed apparatus improves the operation of the PSB and PSB-type floating barrier systems. Any configuration of the apparatus can offer specific improvements to current practice. For example the configuration of FIG. 13a-c is ideally suited to manage the movement of strings of PSB's, enabling these structures to travel along a separately connected track cable 37, thereby reducing the forces to latch and secure the gate, and enabling the capability to automate movement.

The transport cable configuration of FIG. 1 can operate PSB's exactly like the operation shown in FIG. 8 and described herein above, where the PSB would replace the LOD 800. This is a significant improvement over current methods of opening and closing PSBs. Commonly found at U.S. naval bases worldwide, PSB barrier gates are manually operated, requiring specially equipped mini tugs, trained operators, and support staff on continuous standby duty to operate the gates.

The U.S. Navy PSB design is difficult to open and close because it is a catenary structure, which collects broadside loads. This can make pulling the PSB line taut enough to close a gate an operation with high loads that is dangerous to staff. The apparatus of FIGS. 2, 3, 4a-b, 13a-c and 14 improve gate operations of the PSB due to their track systems and trolleys 27, 31, track cables 37, and tow cables 42, 42a, 1403a-b, 1405a-b which separate the forces of wind, wave and current from those of opening and closing the gate. For example, the apparatus of FIG. 3 utilizes the mooring trolley 31 to relieve the floating barrier of much of its environmental loads (a shown in FIG. 5) while being driven by the tow cable 332, which moves the barrier without using a service boat and crew.

FIG. 11 illustrates the security barrier 1100, which is a catamaran type structure. As a twin pontoon floating breakwater design, it easily moves in a straight line guided by the mooring trolley components of the apparatus of FIG. 2, 3, or 4a-b (see reference numeral 1110 of FIG. 11). In this arrangement, the broadside loads to the structure 1100 are transferred to the apparatus below the waterline 26 and not out to the ends of the floating barriers 1100 as is the current circumstance with U.S. Navy PSB systems. The loads are shown in FIG. 5. The majority of environmental loads from wind, waves, and current are no longer constrained at the end connections of the barriers. This is a significant improvement to operations and maintenance of the PSB systems, and of the safety of operating staff.

Figure 11A:
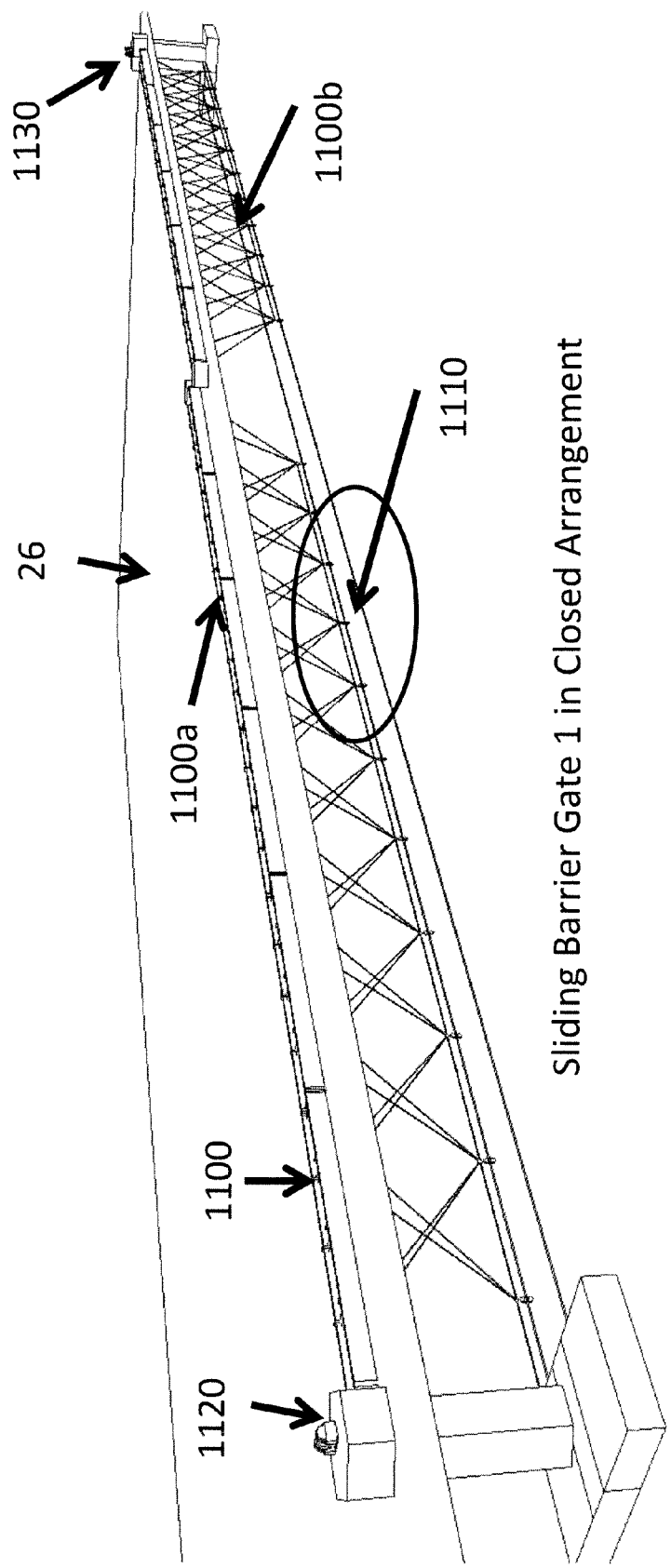
FIGS. 11a and 11b illustrate an application of the apparatus of the present disclosure to operate a barrier gate.
Figure 11B:
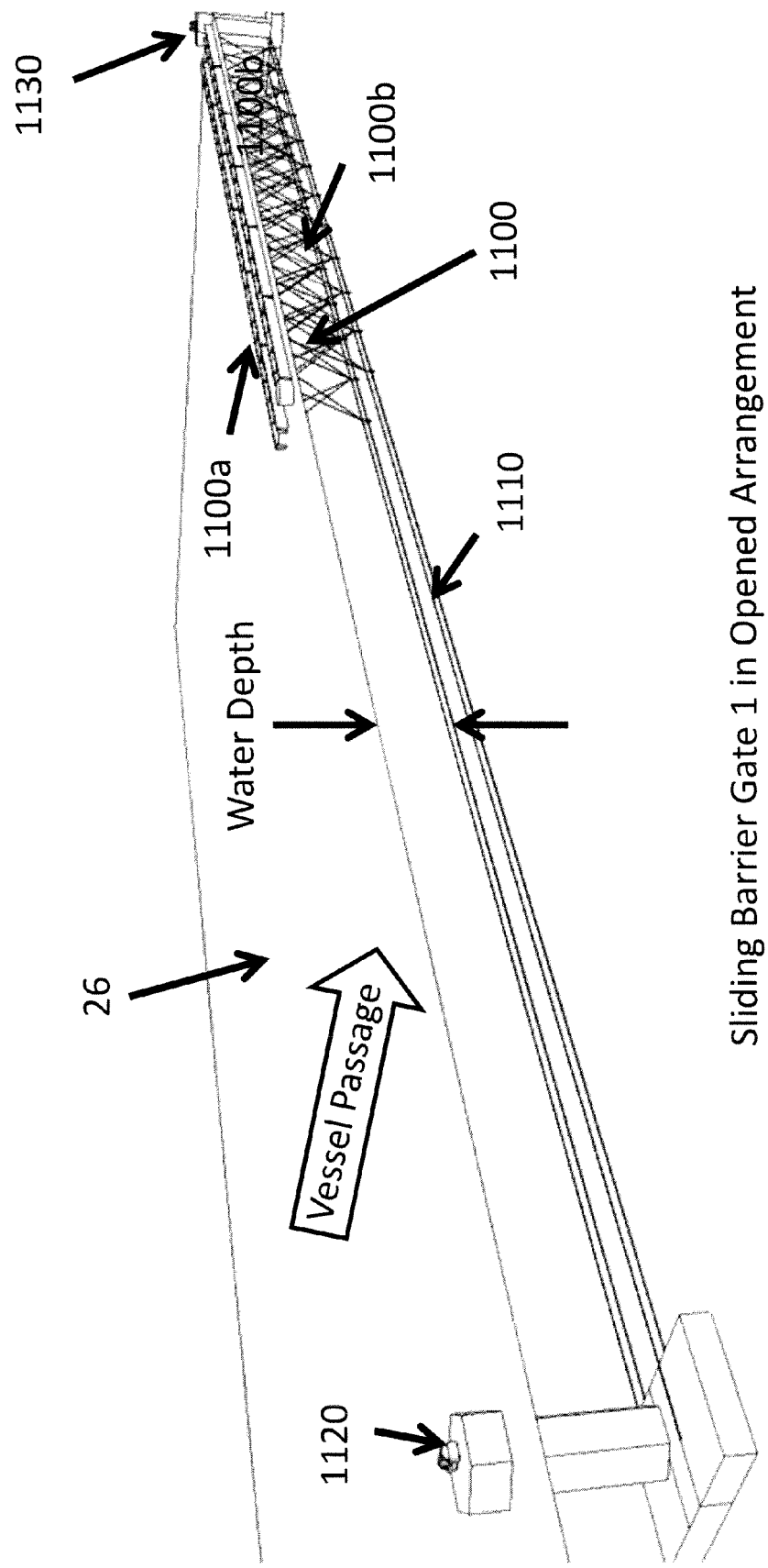

FIG. 11a shows the barrier 1100 in a closed position, where the gate components 1100a and 1100b span from one stanchion 1120 to another stanchion 1130. FIG. 11b shows the barrier 1100 in an open position, where the gate component 1100a has been moved by the apparatus 1110 to allow passage of a vessel in the direction of the arrow between the stanchion 1120 and the barrier 1100.

Arrangements for Oil Boom Operation

Oil containment "booming" operations are carried out along all types of coastal and riverine shorelines. The most successful installations operate as combined diversion and collection systems. The resulting boom arrangements are positioned at angles to the shoreline and usually staggered and cascading in design, and work with tidal action or current flows to harvest tramp oil, tarballs, and flotsam. Boom arrangements that block vessel traffic benefit by an installation of the transport cable apparatus of FIG. 1, arranged such that the boom is opened by hinging from one end.

Figure 12:
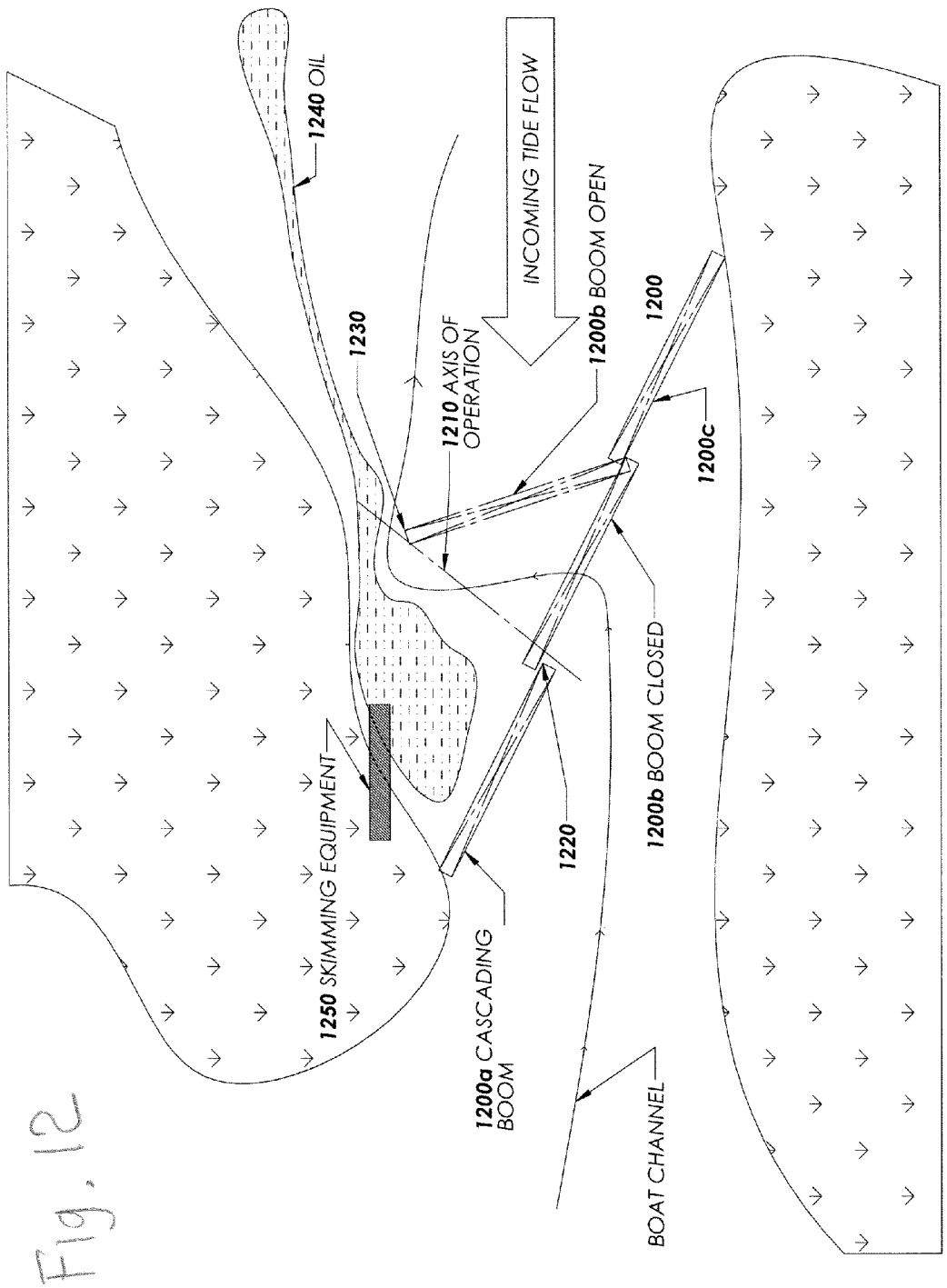
FIG. 12 illustrates an application of the apparatus of the present disclosure to move an oil containment boom.

FIG. 12 illustrates an oil containment boom operation using the apparatus of FIG. 1. An oil boom assembly 1200 comprises several cascading booms 1200a-c, of which 1200a and 1200c are fixed, and 1200b is movable between an open and a closed position by a cable transport apparatus 1210 that pivotally moves one end of boom 1200b between points 1220 and 1230. Thus, the oil 1240 can be contained by boom 1200, and treated by skimming equipment 1250, etc.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An apparatus for moving a marine structure, the apparatus comprising:
   a transport cable disposed under the surface of a body of water, the transport cable extending from a first point to a second point for defining a path of motion of the marine structure, the transport cable being movably mounted such that a riser attachment point on the cable is movable between the first and second points;
   a riser cable having a first end fixedly attached to the riser attachment point of the transport cable, and a second end fixedly attached to the marine structure; and
   a drive unit for moving the transport cable such that the riser cable moves between the first and second points and the marine structure moves along the path;

wherein the marine structure is a gate, and the path of motion is for opening and closing the gate.

2. The apparatus of claim 1, comprising a pair of the riser cables attached to the riser attachment point, the riser cables being attached to separate points of the marine structure such that they respectively form substantially equal opposing angles with the transport cable.

3. The apparatus of claim 1, wherein the transport cable is an endless loop;
wherein the apparatus further comprises a pair of sheaves rotatably mounted at the first and second points for movably supporting the transport cable; and
wherein the drive unit is for rotating one of the sheaves for moving the transport cable.

4. The apparatus of claim 3, wherein the drive unit comprises a winch fixedly mounted above the surface of the body of water, and the drive unit further comprises a drive cable between the winch and the one of the sheaves for moving the transport cable.

5. The apparatus of claim 1, wherein the drive unit comprises a pair of winches, and the transport cable is attached to the winches for winding onto a first one of the winches for moving the riser attachment point from the first point to the second point, and for winding onto a second one of the winches for moving the riser attachment point from the second point to the first point.

6. An apparatus for moving a marine structure, the apparatus comprising:
a track fixedly mounted under the surface of a body of water, the track extending from a first point to a second point for defining a path of motion of the marine structure;
a riser cable having a first end movably attached to the track between the first and second points, and a second end fixedly attached to the marine structure;
a trolley attached to the first end of the riser cable between the first end and the track, and comprising a roller for engaging the track for distributing environmental forces of the marine structure to the track; and
a drive unit attached to the marine structure for moving the marine structure such that the riser cable moves between the first and second points and the marine structure moves along the path.

7. The apparatus of claim 6, comprising a pair of the riser cables with their first ends attached to each other, the riser cables being attached to separate points of the marine structure such that they respectively form substantially equal opposing angles with the track.

8. The apparatus of claim 6, wherein the drive unit comprises a tow cable with a first end attached to the marine structure, and a winch attached to a second end of the tow cable; wherein the tow cable is windable onto the winch for moving the marine structure.

9. The apparatus of claim 6, wherein the drive unit comprises a tow cable with a first end attached to the marine structure, and a tug or a thruster attached to a second end of the tow cable for moving the marine structure.

10. An apparatus for moving a marine structure, the apparatus comprising:
a track fixedly mounted under the surface of a body of water, the track extending from a first point to a second point for defining a path of motion of the marine structure;
a riser cable having a first end movably attached to the track between the first and second points, and a second end fixedly attached to the marine structure;
a trolley attached to the first end of the riser cable between the first end and the track, and comprising a roller for engaging the track for distributing environmental forces of the marine structure to the track; and
a drive unit attached to the trolley for moving the trolley such that the riser cable moves between the first and second points and the marine structure moves along the path.

11. The apparatus of claim 10, comprising a pair of the riser cables with their first ends attached to the trolley, the riser cables being attached to separate points of the marine structure such that they respectively form substantially equal opposing angles with the trolley.

12. The apparatus of claim 10, wherein the drive unit comprises a tow cable with a first end attached to the trolley, and a winch attached to a second end of the tow cable;
wherein the tow cable is windable onto the winch for moving the marine structure.

13. The apparatus of claim 10, further comprising:
a tow cable attached to the trolley, the tow cable being an endless loop; and
a pair of sheaves rotatably mounted at the first and second points for movably supporting the tow cable;
wherein the drive unit is for rotating one of the sheaves for moving the tow cable.

14. The apparatus of claim 13, wherein the drive unit comprises a winch fixedly mounted above the surface of the body of water, and the drive unit further comprises a drive cable between the winch and the one of the sheaves for moving the tow cable.

15. The apparatus of claim 10, wherein the drive unit comprises a tow cable attached to the trolley, and a pair of winches;
wherein the tow cable is attached to the winches for winding onto a first one of the winches for moving the trolley from the first point to the second point, and for winding onto a second one of the winches for moving the trolley from the second point to the first point.

16. The apparatus of claim 10, wherein the marine structure is one of an aquaculture feed barge, gill net, and cage.

17. An apparatus for moving a marine structure, the apparatus comprising:
a track fixedly mounted under the surface of a body of water, the track extending from a first point to a second point for defining a path of motion of the marine structure;
a first riser cable having a bottom end movably attached to the track between the first and second points, and a top end fixedly attached to the marine structure;
a first trolley attached to the bottom end of the first riser cable between the bottom end and the track, and comprising a roller for engaging the track for distributing environmental forces of the marine structure to the track;
a first drive unit attached to the first trolley for moving the first trolley in a first direction along the track;
a second riser cable having a bottom end movably attached to the track between the first and second points, and a top end fixedly attached to the marine structure;
a second trolley attached to the bottom end of the second riser cable between the bottom end and the track, and comprising a roller for engaging the track for distributing environmental forces of the marine structure to the track;
a second drive unit attached to the second trolley for moving the second trolley in a second direction along the track cable, the second direction being opposite the first direction; and a control system for controlling the first and second drive units, responsive to a measured tension in each of the first and second riser cables, such that the riser cables move between the first and second points and the marine structure moves along the path in one of the first direction and the second direction.

18. The apparatus of claim 17, wherein the first drive unit comprises a first tow cable with a first end attached to the first trolley, and a first winch attached to a second end of the first tow cable;
   wherein the second drive unit comprises a second tow cable with a first end attached to the second trolley, and a second winch attached to a second end of the second tow cable;
   wherein the first and second winches are controllable by the control system for respectively winding and unwinding the first and second tow cables for moving the marine structure.

19. The apparatus of claim 17, wherein the first and second riser cables are for attaching to the marine structure such that the marine structure floats on the surface of the body of water; and
   wherein the control system is for controlling the first and second drive units to compensate for changes in a depth of the body of water.

20. The apparatus of claim 17, wherein each of the first and second riser cables are attached to separate points of the marine structure such that they respectively form substantially equal opposing angles with the first and second trolleys.

21. An apparatus for moving a buoyant marine structure, the apparatus comprising:
   a track cable extending from a first point to a second point for defining a path of motion of the marine structure at the surface of a body of water, the track cable having first and second opposing ends, the first point and the second point being between the first and second opposing ends;
   a roller attached to the marine structure for movably engaging the track cable; a fixed track cable mount attached to the first end of the track cable;
   a track cable drive unit attached to the second end of the track cable for moving the track cable between a first position where the track cable is proximal the surface of the body of water, and a second position where a portion of the track cable is under the surface of the body of water; and
   a marine structure drive unit attached to the marine structure for moving the marine structure, when the track cable is in the first position, such that the roller moves between the first and second points and the marine structure moves along the path.

22. The apparatus of claim 21, wherein the marine structure drive unit comprises a tow cable with a first end attached to the marine structure, and a winch attached to a second end of the tow cable;
   wherein the tow cable is windable onto the winch for moving the marine structure; and
   wherein the winch is for adjusting the position of the tow cable between a first position where the tow cable is proximal the surface of the body of water and a second position where a portion of the tow cable is under the surface of the body of water.

23. The apparatus of claim 21, wherein the marine structure drive unit comprises a tow cable with a first end attached to the marine structure, and a tug or a thruster attached to a second end of the tow cable for moving the marine structure.

24. The apparatus of claim 21, wherein the marine structure drive unit comprises a first tow cable having one end attached to the marine structure and extending towards the first point, and a first winch attached to an opposing end of the first tow cable;
   wherein the first tow cable is windable onto the first winch for moving the marine structure towards the first point;
   wherein the first winch is for adjusting the position of the first tow cable between a first position where the first tow cable is proximal the surface of the body of water and a second position where a portion of the first tow cable is under the surface of the body of water;
   wherein the marine structure drive unit comprises a second tow cable having one end attached to the marine structure and extending towards the second point, and a second winch attached to an opposing end of the second tow cable;
   wherein the second tow cable is windable onto the second winch for moving the marine structure towards the second point; and
   wherein the second winch is for adjusting the position of the second tow cable between a first position where the second tow cable is proximal the surface of the body of water and a second position where a portion of the second tow cable is under the surface of the body of water.

25. An apparatus for moving first and second buoyant marine structures in opposing directions, the apparatus comprising:
   a first tow/track cable drive unit mounted at a first fixed point;
   a first tow/track cable having a first end attached to the first tow/track cable drive unit, the first tow/track cable extending along an axis of the first marine structure, movably attached to the first marine structure, and having a second end fixedly attached to the second marine structure;
   a second tow/track cable drive unit mounted at a second fixed point opposite the first fixed point;
   a second tow/track cable having a first end attached to the second tow/track cable drive unit, the second tow/track cable extending along an axis of the second marine structure, movably attached to the second marine structure, and having a second end fixedly attached to the first marine structure;
   wherein the first tow/track cable drive unit is for moving the first tow/track cable between a first position where the first tow/track cable is proximal the surface of the body of water and a second position where a portion of the first tow/track cable is under the surface of the body of water;
   wherein the second tow/track cable drive unit is for moving the second tow/track cable between a first position where the second tow/track cable is proximal the surface of the body of water and a second position where a portion of the second tow/track cable is under the surface of the body of water;
   wherein the first tow/track cable drive unit is for moving the first tow/track cable to move the second marine structure towards a central point between the first and second fixed points when the second tow/track cable is in its first position; and
   wherein the second tow/track cable drive unit is for moving the second tow/track cable to move the first marine structure towards the central point when the first tow/track cable is in its first position.

26. The apparatus of claim 25, comprising a first roller attached to the first marine structure for movably engaging the first tow/track cable, and a second roller attached to the second marine structure for movably engaging the second tow/track cable.

27. The apparatus of claim 25, comprising:
a first retract cable drive unit mounted proximal the first fixed point; a first retract cable having a first end attached to the first retract cable drive unit, and having a second end fixedly attached to the first marine structure;
a second retract cable drive unit mounted proximal the second fixed point;
a second retract cable having a first end attached to the second retract cable drive unit, and having a second end fixedly attached to the second marine structure;
wherein the first retract cable drive unit is for moving the first retract cable to move the first marine structure away from the central point and towards the first fixed point; and
wherein the second retract cable drive unit is for moving the second retract cable to move the second marine structure away from the central point and towards the second fixed point.

28. The apparatus of claim 27, wherein the first and second marine structures are each expandable and retractable along a longitudinal axis;
wherein the first marine structure has an inner end attached proximal the first fixed point and an outer end opposite the inner end along its longitudinal axis, and the second marine structure has an inner end attached proximal the second fixed point and an outer end opposite the inner end along its longitudinal axis;
wherein the first tow/track cable extends along the longitudinal axis of the first marine structure, and its second end is fixedly attached to the outer end of the second marine structure;
wherein the second tow/track cable extends along the longitudinal axis of the second marine structure, and its second end is fixedly attached to the outer end of the first marine structure;
wherein the first tow/track cable drive unit is for moving the first tow/track cable to expand the second marine structure towards the central point;
wherein the second tow/track cable drive unit is for moving the second tow/track cable to expand the first marine structure towards the central point;
wherein the first retract cable drive unit is for moving the first retract cable to retract the first marine structure away from the central point and towards the first fixed point; and
wherein the second retract cable drive unit is for moving the second retract cable to retract the second marine structure away from the central point and towards the second fixed point.

29. The apparatus of any one of claims 6, 10, 17, 21, and 25, wherein the track is a flexible cable, and the apparatus further comprises a tensioner for setting a tension of the track cable.

30. The apparatus of any one of claims 6 and 10, wherein the track comprises a plurality of rails, and the trolley engages each of the plurality of rails.

31. The apparatus of any one of claims 6, 10, 17, 21, and 25, wherein the marine structure is a gate, and the path of motion is for opening and closing the gate.

32. The apparatus of any one of claims 6 and 10, wherein the marine structure is a pontoon.

33. The apparatus of any one of claims 6, 10, 17, 21 and 25, wherein the marine structure is an expandable or collapsible, nesting arrangement of marine barriers or gates.

34. An apparatus for moving a marine structure, the apparatus comprising:
a transport cable disposed under the surface of a body of water, the transport cable extending from a first point to a second point for defining a path of motion of the marine structure, the transport cable being movably mounted such that a riser attachment point on the cable is movable between the first and second points;
a riser cable having a first end fixedly attached to the riser attachment point of the transport cable, and a second end fixedly attached to the marine structure; and
a drive unit for moving the transport cable such that the riser cable moves between the first and second points and the marine structure moves along the path;
wherein the marine structure is an oil containment boom, and the path of motion is for opening and closing the boom.

* * * * *